United States Patent
Yu

(10) Patent No.: US 11,704,045 B2
(45) Date of Patent: Jul. 18, 2023

(54) SELF-LEARNING FILE TRANSMITTING, DATA READING AND WRITING, APP COMMUNICATION READING AND WRITING METHODS OF GAME HANDLE

(71) Applicant: SHENZHEN GULI TECH CO., LTD., Shenzhen (CN)

(72) Inventor: Hongyong Yu, Shenzhen (CN)

(73) Assignee: SHENZHEN GULI TECH Co., Ltd., Shenzhen (CN)

( * ) Notice: Subject to any disclaimer, the term of this patent is extended or adjusted under 35 U.S.C. 154(b) by 255 days.

(21) Appl. No.: 17/144,170

(22) Filed: Jan. 8, 2021

(65) Prior Publication Data
US 2021/0389900 A1 Dec. 16, 2021

(30) Foreign Application Priority Data

Jun. 11, 2020 (CN) .......................... 202010532568.3
Jun. 11, 2020 (CN) .......................... 202010532569.8
Jun. 11, 2020 (CN) .......................... 202010533275.7

(51) Int. Cl.
*G06F 3/06* (2006.01)
*G06N 20/00* (2019.01)
*H04W 4/80* (2018.01)

(52) U.S. Cl.
CPC .......... *G06F 3/0652* (2013.01); *G06F 3/0604* (2013.01); *G06F 3/0679* (2013.01); *G06N 20/00* (2019.01); *H04W 4/80* (2018.02)

(58) Field of Classification Search
None
See application file for complete search history.

(56) References Cited

U.S. PATENT DOCUMENTS

| 6,071,194 A * | 6/2000 | Sanderson | A63F 13/22 463/37 |
| 7,982,739 B2 * | 7/2011 | Pasula | A63F 13/92 345/473 |
| 8,497,836 B2 * | 7/2013 | Toebes | G06F 21/83 345/156 |
| 2002/0147041 A1 | 10/2002 | Cheng | |
| 2012/0026097 A1 * | 2/2012 | Gilson | G06F 3/038 345/173 |
| 2014/0198046 A1 * | 7/2014 | Roskind | G06F 3/038 345/168 |
| 2014/0347298 A1 | 11/2014 | Park et al. | |

(Continued)

FOREIGN PATENT DOCUMENTS

EP 1208883 A2 5/2002

*Primary Examiner* — Elias Mamo
(74) *Attorney, Agent, or Firm* — Craft Chu PLLC; Andrew W. Chu

(57) ABSTRACT

The present application discloses self-learning file transmitting, data reading and writing, and APP communication reading and writing methods of a game handle. The self-learning file transmitting method includes the following steps: S1: initializing a chip and scanning a key value; S2: erasing a FLASH chip and forming a reminder of usage; S3: scanning the key value and starting timing; and S4: timing and scanning the key value, and forming a reminder showing the end of learning. The present application provides a learning AI key with a special function on the game handle, and the AI key function can record operations of all users and save them as data for internal storage.

13 Claims, 12 Drawing Sheets

(56) References Cited

U.S. PATENT DOCUMENTS

| | | | |
|---|---|---|---|
| 2015/0052292 A1* | 2/2015 | Mylly | G06F 3/0643 |
| | | | 711/103 |
| 2017/0187828 A1 | 6/2017 | Soji et al. | |
| 2019/0118089 A1 | 4/2019 | Ying et al. | |
| 2020/0233500 A1* | 7/2020 | Mannby | G06F 3/04886 |

* cited by examiner

SELF-LEARNING FILE TRANSMITTING, DATA READING AND WRITING, APP COMMUNICATION READING AND WRITING METHODS OF GAME HANDLE

CROSS-REFERENCE TO RELATED APPLICATION

This non-provisional application claims priority under 35 U.S.C. § 119(a) on Patent Application No(s). 2020105332757, 2020105325698, 2020105325683 filed in China on Jun. 11, 2020, the entire contents of which are hereby incorporated by reference.

BACKGROUND OF THE INVENTION

1. Field of the Invention

The present application relates to a technical field of data self-learning, and particularly, to self-learning file transmitting, data reading and writing, and APP communication reading and writing methods of a game handle.

2. Description of the Related Art

The game handle is a component of a video game console. The player can control game roles by controlling buttons on the game handle. With the upgrading and updating of hardware of the gaining device, the modern game handle has further been provided with an analog rocker (direction and perspective), a trigger key, a HOME menu key, etc.

In accordance with the usage, the game handles are classified into a PC game handle, a dedicated game handle, a mobile-phone game handle and a tablet game handle. In accordance with the product type, the game handles are classified into a wired game handle and a wireless game handle.

At present, the game console and the mobile phone have more powerful functions and better images, and thus can realize more actions and possess more and more complex operations. In addition to use of existing keys of the game handle, multiple operations are performed by more complex combination of keys or by the keys in a certain order, which makes novice players and female players struggled. In order to let the players spend more time in the game, game developers deliberately increase some difficulty in the game, such as fast keys, complex combination of keys, a large number of repeated leveling or the like.

At present, however, the game handle on the market does not have the function of simulating and recording operation data of a user after being used by the user, such that the user can only operate the used handle once and individually and cannot store the operation record data. In addition, the game handle does not have the function of reading and writing the learning data, and lacks interactive entertainment with others.

The main purpose of the present application is to solve the above problems, and achieve that the game handle can carry out some repeated and complex operations in place of the player, thereby reducing the difficulty of getting started in the game and saving the player a lot of time.

With respect to the problem in the prior art that the user needs to simultaneously control multiple keys to complete one complex operation while operating the handle such that the gaining experience of the user is poor, the prior art has not yet provided an effective solution.

BRIEF SUMMARY OF THE INVENTION

In a first aspect, the present application provides a self-learning iii file transmitting method of a game handle, so as to solve the problem that the user can only operate the handle once and individually and cannot store the operation record data. The method comprises steps of:

reading a key value of an AI key in the handle and identifying whether the AI key is pressed after initialization of the handle, and identifying whether a pressing time of the AI key reaches a preset value if the AI key is pressed;

carrying out an erasing operation on a FLASH chip of the handle after the pressing time of the AI key reaches the preset value, and controlling the handle to output a reminder after the erasing operation;

reading a key value of each key of the handle and identifying whether any key of the handle is pressed after the reminder is output, wherein if any key of the handle is pressed, a timer starts timing; and storing operation record data after a timing period of the timer reaches the preset value.

In a second aspect, the present application provides a self-learning file transmitting method of a game handle, comprising steps of:

S1: initializing a chip and scanning a key value, wherein a power supply key is activated, the handle is powered on and each chip in the handle is initialized; keys are scanned for a first time, a key value of each key in the handle is read and it is identified whether an AI key is pressed; if yes, it is identified whether a pressing time of the AI key reaches a preset value if the AI key is pressed;

S2: erasing a FLASH chip and forming a reminder: an erasing operation is carried out on the FLASH chip if the pressing time of the AI key reaches the preset value; after erasing, the handle vibrates once as a reminder of usage;

S3: scanning the key value and starting timing, wherein after the reminder of usage, the keys are scanned for a second time, the key value of each key in the handle is read and it is identified whether any key is pressed; if any key is pressed, a timer is reset and starts timing; and S4: timing and scanning the key value, and forming a reminder showing an end of learning, wherein the timing period of the timer reaches the preset value, the handle vibrates to remind the end of learning, and storing operation record data by the handle ends; after learning, proceed to step S1 again.

In a third aspect, the present application provides a self-learning and data reading and writing method of a game handle, comprising steps of:

S1: initializing a chip and scanning a key value, wherein a power supply key is activated, the handle is powered on and each chip in the handle is initialized; keys are scanned for a first time, a key value of each key in the handle is read and it is identified whether an AI key is pressed; if the AI key is pressed, it is identified whether the AI key and a setting key of the game handle are pressed simultaneously;

S2: switching a U disk to perform reading and writing: if it is identified that the AI key and the setting key of the game handle are pressed simultaneously, a USB interface is switched to a U-disk enumeration mode, and a computer terminal is used to read and write key value data of a FLASH memory; and S3: completing reading and writing data, and ending scanning of the key value, wherein when reading and writing key value data of the FLASH memory are completed at the computer terminal, the key value of the AI key is re-scanned, and it is identified whether the power ON/OFF key, the setting key and a learning key are pressed; if the power ON/OFF key, the setting key and a learning key are pressed, shut down, and if at least one of the power ON/OFF key, the setting key and a learning key is not pressed, return to step S2 again.

In a fourth aspect, the present application provides a file self-learning and APP communication reading and writing method of a game handle, comprising steps of:

S1: initializing a chip, scanning a key value and identifying APP communication requirements, wherein a power supply key is activated, the handle is powered on and each key chip in the handle is initialized; keys are scanned for a first time, a key value of each chip in the handle is read, meanwhile it is identified whether an APP Bluetooth module is required to transmit files; if the APP Bluetooth module is required to transmit files, FLASH data are read and written according to APP control signals; it is identified whether reading and writing is completed after the data are read, re-scanning is performed upon completion of reading and writing, and FLASH data are read and written again according to the APP control signals if reading and writing are not completed;

S2: erasing a FLASH chip if transmission of files is not required and forming a reminder of usage, wherein in step S1, when the APP Bluetooth module is not required to transmit files, it is identified whether the AI key is pressed; if the AI key is pressed, it is identified whether a pressing time of the AI key reaches a preset value; an erasing operation is carried out on the FLASH chip if the pressing time of the AI key reaches the preset value; after erasing, the handle vibrates once as a reminder of usage;

S3: scanning a key value and starting timing, wherein after forming the reminder of usage, the keys are scanned for a second time, the key value of each key in the handle is read and it is identified whether any key is pressed; if any key is pressed, a timer is reset and starts timing;

S4: timing and scanning the key value, and forming a reminder showing an end of learning, wherein the timing period of the timer reaches the preset value, the handle vibrates to remind the end of learning, and storing operation record data by the handle ends; after learning, proceed to step S1 again.

Through the present application, the game experience of the user is improved by performing key learning so as to enable that data output by a simple operation of triggering one key are the same as data output by a complex operation of triggering multiple keys. Moreover, the key value can be read at different times and stored as the operation record data input by the user. When the user uses the handle at the next time, the handle can be directly controlled based on the operation record data at the previous time, thereby solving the problem that the user can only operate the handle once and individually and cannot store the operation record data, and achieving the effect of adjusting and controlling the handle for multiple times according to personal use habits.

DETAILED DESCRIPTION OF THE INVENTION

Figure 1:
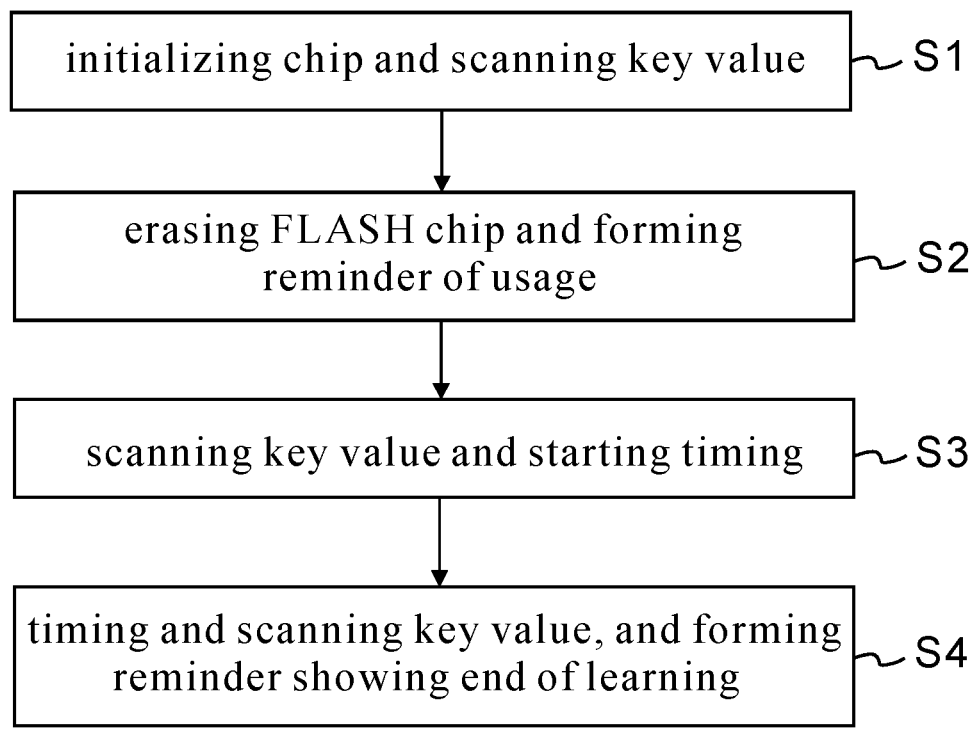
FIG. 1 is a flow diagram showing a method for self-learning file transmission according to the present application.

In order to make those skilled in the art understand the solution of the present application better, the technical solutions in embodiments of the present application will be described clearly and comprehensively below in conjunction with accompanying drawings of the embodiments of the present application. Apparently, the described embodiments are merely some of rather than all of the embodiments of the present application. Based on the embodiments of the present application, all other embodiments obtained by those of ordinary skilled in the art without making creative efforts should fall within the scope of protection of the present application.

It should be noted that the terms "first", "second" and so forth in the description and claims as well as the drawings of the present application are used to distinguish similar objects, and are not necessarily to describe a particular order or sequential order. It should be understood that the data used this way may be interchanged where appropriate in order to facilitate the embodiments of the present application described herein. In addition, terms "comprising", "having", and any variations thereof are intended to cover non-exclusive inclusions, for example, processes, methods, systems, products or devices that contain a series of steps or units need not be limited to those explicitly listed steps or units, but may include other steps or units not explicitly listed or inherent to these processes, methods, products or devices.

It should be noted that the embodiments of the present application and the features in the embodiments can be combined with each other without conflict. The present application will be described in detail below with reference to the accompanying drawings and in conjunction with embodiments.

Embodiment 1

The present application provides a self-learning file transmitting method of a game handle, comprising steps of:

S1: reading a key value of an AI key in the game handle and identifying whether the AI key is pressed after an initialization of the game handle, and identifying whether a pressing time of the AI key reaches a preset value if the AI key is pressed;

S2: performing an erasing operation on a FLASH chip of the game handle after the pressing time of the AI key reaches the preset value, and controlling the game handle to output a reminder after the erasing operation;

S3: reading a key value of each key of the game handle and identifying whether any key of the game handle is pressed at this time after the reminder is output, wherein if any key of the game handle is pressed, a timer starts timing; and S4: storing operation record data after a timing period of the timer reaches the preset value.

In the present embodiment, after the game handle is initialized, the key value of the AI key is read to identify a state of the AI key, and when a user wants to write book data, the pressing time of the AI key can be controlled to reach the preset value even if the data can be read by the game handle. In addition, after the erasing operation is performed on the FLASH chip a reminder is made upon the preset value, the key value of each key on the game handle is read at this time, and the operation record data are stored when the pressing time of any key of the handle reaches the preset key value of each key of the game handle.

In the present embodiment, the game experience of the user can be improved by performing key learning so as to enable that data output by a simple operation of triggering one key are the same as data output by a complex operation of triggering multiple keys.

By means of the above manner, the key value can be read at different times and the operation record data input by the user can be stored. When the user uses the game handle at the next time, the operation record data at the previous time of the game handle can be directly output, thereby solving the problem that the user can only operate the previously used game handle once and individually and cannot store the operation record data in the game handle, and achieving the effect of adjusting and controlling the game handle multiple times according to personal use habits.

The present application relates to a method of self-learning data of the operation key, and particularly to a method for storing operation data and outputting operation instructions via self-learning, comprising the following steps:

S101: reading a key value of an AI key of the game handle, identifying whether the AI key is pressed, and identifying whether a pressing time of the AI key reaches a preset value if the AI key is pressed;

S102: performing an erasing operation on a FLASH memory of the game handle after the pressing time of the AI key reaches the preset value;

S103: scanning and reading a key value of each key of the game handle and identifying whether any key of the game handle is pressed at this time; and S104: storing data of the key value (key value data, hereafter) of the key, which are read by scanning, in the FLASH memory in the game handle.

The key value data of the key stored in the flash memory of the game handle can be used as the operation instruction data, which can be output through the output port of the game handle to, for example, a hardware host (such as a game console) for executing the operation instructions.

Therefore, the method further includes the following steps:

S5: reading key value data of the key stored in the FLASH memory of the game handle, and serving the data as the operation instruction data which are output through the output port of the game handle, when a certain condition is present.

More specifically, the method can further include step S101: initializing the game handle, and reading the key value of the AI key of the game handle to identify whether the AI key is pressed after completion of the initialization, wherein it is identified whether the pressing time of the AI key reaches the preset value if the AI key is pressed. For example, a pressure sensor can be provided at the bottom of the key (including the AI key) to acquire the key value of the key.

The method can further include step S102: outputting a first reminder by e.g. long-vibrating the handle once to remind the user that scanning is to be started and the key record is stored, after the erasing operation on the FLASH memory of the handle is completed.

The method can further include step S103: starting to scan and read the key value of each key of the game handle after the reminder is output, and identifying whether any key of the handle is pressed at this time.

The method can further include step S104: scanning the key value data of the key obtained by reading, wherein on one hand, the data are output in real time as real-time operation instructions through the output port of the game handle to, for example, a hardware host (such as a game console), and on the other hand, the data are stored in the FLASH memory of the handle as the operation record data. Thus, the operation process (such as the game operation process) will not be interrupted, wherein on one hand, the operation process is performed in real time on the hardware host (such as the game console) by the operation indicated by the key, and on the other hand, the operation record is stored in the FLASH memory of the game handle.

Further, the method can further include S104: starting timing by the timer when any key is pressed; scanning and reading the key value data of the key when the timing period of the timer does not reach the preset value, and storing the data in the FLASH memory in the game handle; ending recording and storing the key value data after the timing period of the timer reaches the preset value; and meanwhile, selectively outputting a second reminder by, for example, short-vibrating the game handle once to remind the user an end of learning/recording. In addition, although the timing period of the timer does not reach the preset value, it is detected by scanning that the AI key is pressed again, so as to end recording and storing the key value data, and meanwhile, a second reminder is selectively output by, for example, short-vibrating the game handle once to remind the user an end of learning/recording.

More specifically, in step S105, the "excitation conditions" for outputting stored data as operation instructions may be various, and the preferable conditions are illustrated as follows.

In one implementation, the game handle of the present application has an AI storage key and an AI output key. The AI storage key is pressed to start scanning and storing of the key value data (operation data) from S101 to S104. The AI output key is pressed to execute steps in S105, and output the key value data of the key stored in the FLASH memory as operation instructions.

In another implementation, the game handle of the present application has only one AI key, and all steps S101 to S105 are controlled by this AI key, but the trigger conditions are different. For example, when the AI key is pressed for a long time, e.g., the AI key is pressed for more than 3 seconds, i.e., the AI key is pressed and the pressing time reaches the preset value (such as 3 seconds), scanning and storing of key value data (operation data) in S101 to S104 are executed. For example, when the AI key is single-clicked and pressed for a short time, i.e., the AI key is pressed but the pressing time does not reach the preset value (such as 3 seconds), the step S105 is executed, and the key value data of the key stored in the FLASH memory is output as operation instructions.

In this way, the game players reset the FLASH memory by long-pressing the AI key, re-scan and store new operation records. By short-pressing the AI key, one key outputs complex operation instructions stored in the FLASH memory. Thus, the complex key combination repeated for multiple times is replaced with a simple one-key output of the AI key, thereby reducing the repeated operations and improving user experience of the game players.

In the present embodiment, the present application further has the function of continuously and repeatedly outputting the stored operation instructions for multiple times, that is, S105 also further includes repeatedly outputting, wherein when the multiple output conditions are triggered, the key value data of the key stored in the FLASH memory of the game handle as the operation instruction data are output for multiple times.

For example, the "multiple output condition being triggered" can be set as that to the "AI output key" is double-clicked, or the "AI key" is double-clicked when there is only one AI key. When the AI key (or AI output key) is double-clicked, i.e., the key is clicked twice in a short time and the time interval between two clicks does not exceed the preset value (e.g., does not exceed 0.5 second), the operation data in the FLASH memory are read, and the stored operation data are repeatedly output as the operation instructions for multiple times.

Further, during executing step S105 (reading operation data in the FLASH memory and outputting the operation data as an operation instruction), if it is detected that any key other than the AI key is pressed, the execution of step S105 is stopped, and the process leaves from the AI output mode and returns to the state of real-time outputting instructions by the key. No matter single output or repeated multiple outputs are executed in S105, there is a similar solution, leaving from the AI output mode and returning to the state of real-time outputting instructions by the key.

In addition, during executing step S105, if it is detected that the AI key is pressed, the process returns to step S101 and it is identified whether the pressing time of the AI key reaches the preset value.

By such setting, the game players can conveniently switch from the AI output mode to the normal real-time operation mode seamlessly, thereby facilitating to pause/suspend outputting the operation instructions stored in the FLASH automatically.

According to the present application, the game handle can learn key records of the user, so as to enable that instructions output by a simple operation of triggering one key are the same as instructions output by a complex operation of triggering multiple keys, thereby enriching use options for the user and improving use experience of the user.

Embodiment 2

The method of the present application can be implemented in the following manner:

The present application provides a self-learning file transmitting method of a game handle, comprising steps of:

S1: initializing a chip and scanning a key value, wherein a power supply key is activated, the handle is powered on and each chip in the handle is initialized; keys are scanned for a first time, a key value of each key of the game handle is read and it is identified whether an AI key is pressed; if the AI key is pressed, it is identified whether the pressing time of the AI key reaches a preset value;

S2: erasing a FLASH chip and forming a reminder of usage, wherein an erasing operation is performed on the FLASH chip if the pressing time of the AI key reaches the preset value; after erasing, the game handle vibrates once to for a reminder of usage;

S3: scanning the key value and starting timing, wherein after forming the reminder by vibrating the game handle, the key is scanned for a second time, the key value of each key of the handle is read and it is identified whether any key is pressed; if any key is pressed, a timer is reset and starts timing; and S4: timing and scanning the key value, and forming a reminder showing an end of learning, wherein the timing period of the timer reaches the preset value, the game handle vibrates to form a reminder showing the end of learning, and operation record data are stored by the handle ends; after the end of learning, it is back to perform step S1 again.

Figure 3:
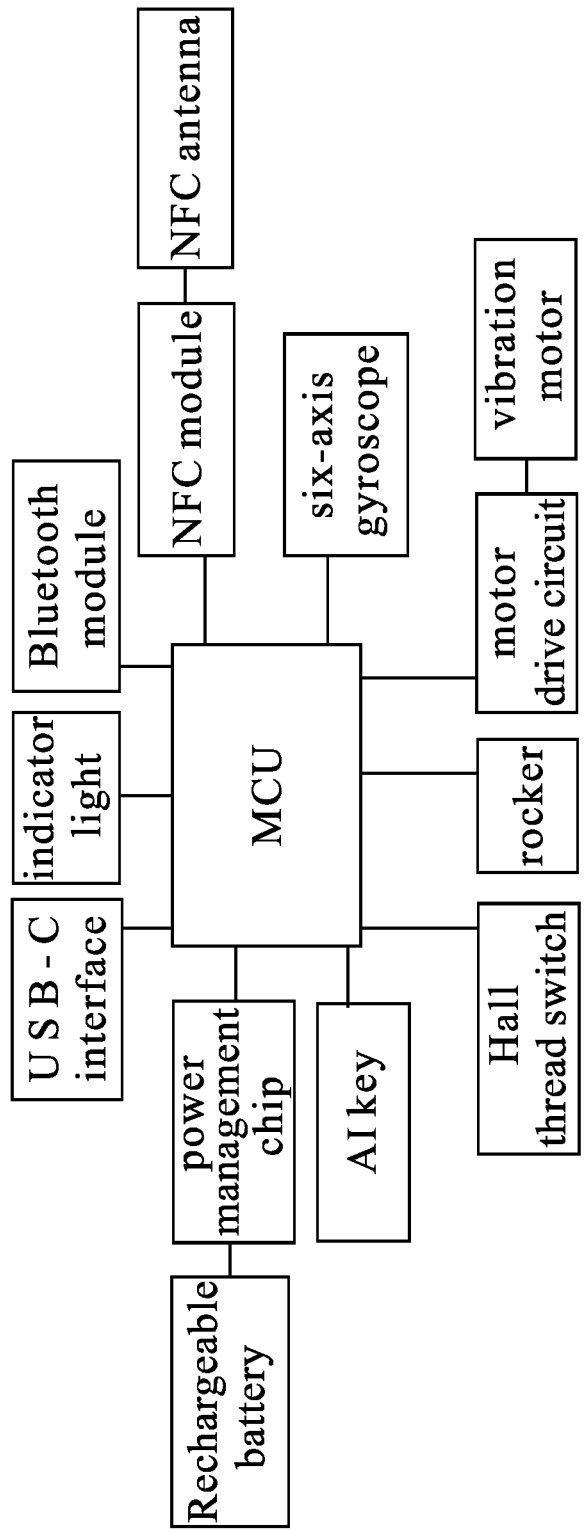
FIG. 3 is a schematic diagram of a structure of a module of a self-learning file transmitting apparatus of a game handle according to the present application.

FIG. 3 is the schematic diagram showing structures of a module of the self-learning file transmitting apparatus of the game handle which includes a schematic diagram showing hardware constitution of the game handle, wherein the game handle includes a controller MCU as a central integrated control chip of the game handle which is electrically connected to other hardware devices including a USB-C interface, an indicator light, a Bluetooth module, a NFC module and a NFC antenna, a 6-axis gyroscope, a motor drive circuit and a vibration motor, a rocker, a hall thread switch, an AI key, a power management chip, a rechargeable battery, etc. The above-mentioned hardware devices are integrated in the game handle, which are the existing market application game and hardware devices. Therefore, the module structure of the game handle will not be described herein.

Similarly, the control chip and the control circuit used in the above-mentioned hardware devices are also well-known in the art, and thus iii will not be described herein.

Figure 2:
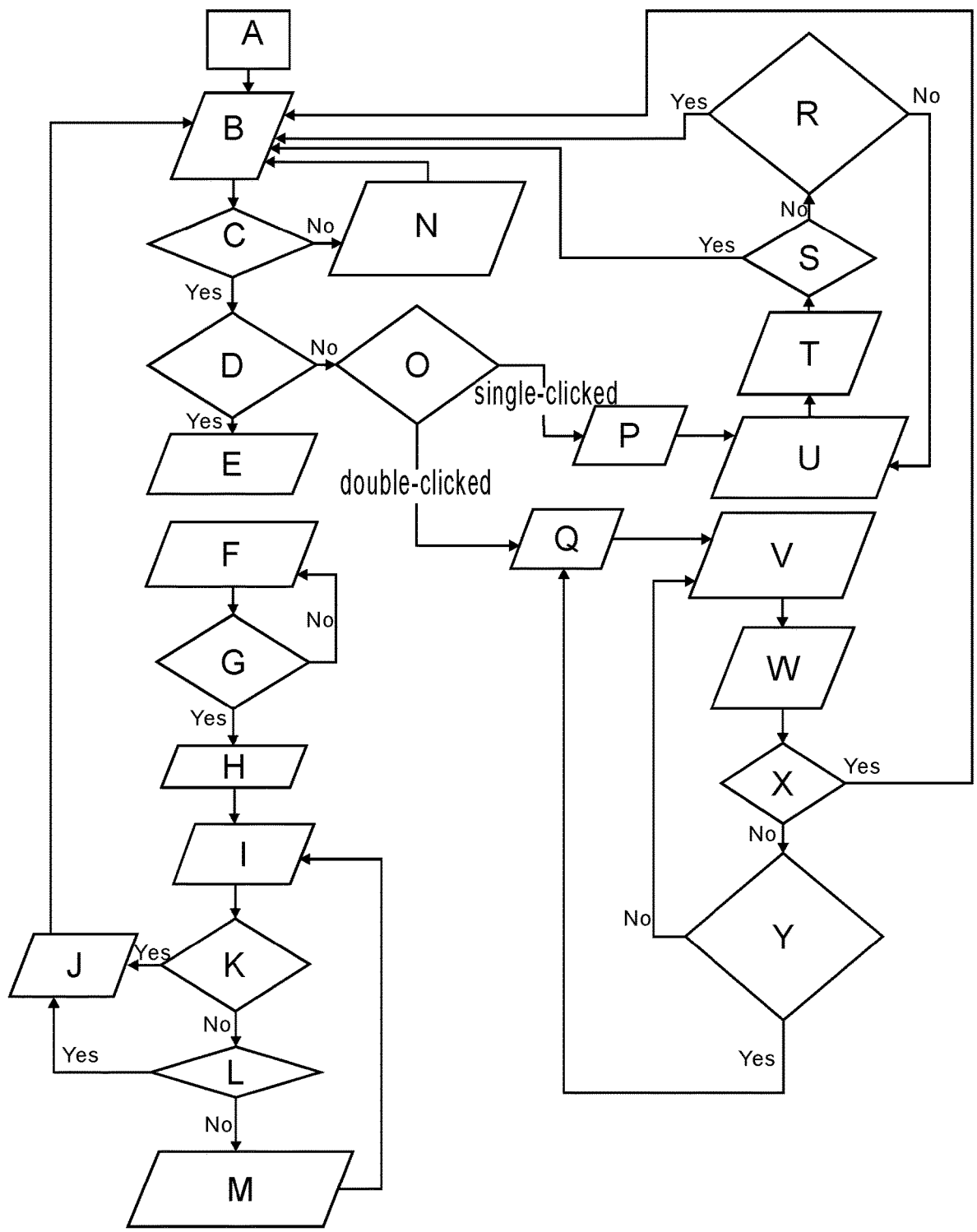
FIG. 2 is a flow diagram showing the logic to perform self-learning file transmission by an AI key according to the present application.

The flow diagram and the logic executed by the AI key are shown in FIG. 1 and FIG. 2, respectively.

In order to simply the flow diagram of FIG. 2, the texts in each box are denoted by a capital letter. The texts denoted by the capital letter in each box of FIG. 2 are listed in Table 1.

TABLE 1

| Capital letter | Texts denoted by the capital letter |
| --- | --- |
| A | powering on and initializing each chip |
| B | scanning key, reading key values of key, rocker and so on |
| C | whether AI key is pressed? |
| D | whether AI key is pressed for 3 seconds? |
| E | erasing FLASH chip, completing erasing and long-vibrating once to form a reminder |
| F | scanning and reading numerical values of key, rocker and so on |
| G | whether any key is pressed? |
| H | resetting time0 by timer and starting timing |
| I | scanning and reading numerical values of key, rocker and so on |
| J | short-vibrating once to form a reminder showing end of learning |
| K | whether time0 of timer reaches preset value? |
| L | whether AI key is pressed? |

TABLE 1-continued

| Capital letter | Texts denoted by the capital letter |
| --- | --- |
| M | reading key value data of key, rocker and so on, transmitting to USB port or Bluetooth port and meanwhile writing into FLASH memory |
| N | reading key value data of key, rocker and so on, transmitting to USB port or Bluetooth port and meanwhile writing into FLASH memory |
| O | Is AI key single-clicked or double-clicked? |
| P | initializing at pointer position of FLASH |
| Q | initializing at pointer position of FLASH |
| R | moving pointer position of FLASH backward for specified length and identifying whether pointer position data is FF? |
| S | whether key is pressed? |
| T | scanning and reading numerical values of key, rocker and so on |
| U | reading data stored in FLASH, transmitting data to output ports such as USB port or Bluetooth port |
| V | reading data stored in FLASH, transmitting data to output ports such as USB port or Bluetooth port |
| W | scanning and reading numerical values of key, rocker and so on |
| X | whether key is pressed? |
| Y | moving pointer position of FLASH backward for specified length and identifying whether pointer position data is FF? |

Before starting the self-learning, the game handle is connected to the power supply, and the power management chip inside the game handle starts to operate to wake up chips of other operating modules.

In this embodiment, the control chip MCU is the model of GD32, and the corresponding AI key is correspondingly connected to the corresponding port of the control chip MCU.

When the AI key is operated for the first time, the initialization setting of the chip is performed. When the key is pressed for a preset time, the original record data in the chip is eliminated and set as zero. The control chip MCU collects in real time operation records of all keys and rockers and stores them in the chip. It is convenient for the next user to directly obtain operation records of the previous user, so that the later user can correspondingly adjust control modes of the game handle in combination with operation records of the previous player for the game handle, such that the players would have a comparative way to play.

There is another implementation in this step in which the original record data can be stored by the memory module I, and the original record data stored in the memory module I in the chip are cleared when the key is pressed for the preset time. Then, the operation records of all keys and rockers are collected in real time and stored in the memory module II by the control chip MCU.

In the present embodiment, when a clicking operation is performed by clicking the AI key, the control switch corresponding to the circuit will make signals at the circuit port of the control chip MCU change. When the pressing time of the AI key reaches three seconds, erasing of the memory data in the FLASH chip is completed. At this time, the game handle has a long vibration once to remind the user of using the game handle, and start recording and storing operation records of the game handle.

When the user starts using the game handle, the control chip reads numerical values of the hardware devices such as keys, rockers and gyroscopes in the internal chip of the game handle again. During the whole process of operating and using the game handle by the user, the operation records are continuously scanned in real time, and the operation records are stored.

When the user uses the game handle, the keys of the game handle are scanned at a specified time, and complete data in the game handle are transmitted to the game console at each scanning.

Further, identifying whether the AI key is pressed further includes: reading the current key value data by the processing chip in S1, transmitting the data encoded by the game handle to a receiving device through the data transmission port of the game handle, and re-scanning the key value, when it is identified that the AI key is not pressed. In the present embodiment, the receiving device of includes but is not limited to a game console or a PC terminal.

When it is identified that the AI key is not pressed, the controller chip rereads data of the devices such as the current key, the rocker and so on, and transmits the data encoded by the game handle to the output port such as the USB port or the Bluetooth, until it is identified that the user presses the AI key.

Further, if the pressing time of the AI key does not reach the preset value, it is identified whether the AI key is single-clicked or double-clicked; and after the identification is completed, an initialization setting is performed at the pointer position of the FLASH.

The clicking time of the AI key in the present embodiment is set as three seconds. If it is detected that the time of clicking the key does not reach three seconds, it is identified whether there is a single click for a long time or multiple clicks for a short time in this process. If the detected time of clicking does not meet the preset time, the clicking state is identified, the pointer position of the FLASH is reset according to the clicking state, the previous operation records are re-erased and the invalid memory is deleted.

The logic steps of clearing the operation memory of the AI key selected according to different clicking states of the user are as follows: cleaning the stored operation records according to the initialization of the FLASH, re-scanning data of the devices such as keys, rockers and gyroscopes, transmitting the data to the output port, and re-scanning by the control terminal. The above steps are repeated.

When it is identified that the AI key is single-clicked, the initialization setting is performed at the pointer position of the FLASH; operation record data stored in the FLASH are read and the operation record data are transmitted to the receiving device through the data transmission port of the game handle; and the process returns to step S1 if the scanning shows that a key is pressed.

If the scanning shows that no key is pressed, the pointer of the FLASH is moved backward for a specified length and it is identified whether the pointer position of the FLASH is FF. If it is identified that the pointer position of the FLASH is FF, the process returns to step S1, and if it is identified that the pointer position of the FLASH is not FF, the operation record data stored in the FLASH are read, and the operation record data are transmitted to the receiving device through the data transmission port of the game handle.

When it is identified that the AI key is double-clicked, the initialization setting is performed at the pointer position of the FLASH; operation record data stored in the FLASH are read and the operation record data are transmitted to the receiving device through the data transmission port of the game handle; and the process returns to step S1 if the scanning shows that a key is pressed.

If the scanning shows that no key is pressed, the pointer of the FLASH is moved backward for a specified length and it is identified whether the pointer position of the FLASH is FF. If it is identified that the pointer position of the FLASH is FF, the initialization setting is performed at the pointer position of the FLASH, and if it is identified that the pointer position of the FLASH is not FF, the operation record data stored in the FLASH are read, and the operation record data are transmitted to the receiving device through the data transmission port of the game handle.

Further, in step S4, it is identified whether AI is pressed if timing of the timer does not reach the preset value; if it is identified that AI is pressed, the game handle vibrates to form a reminder showing the end of learning, and storing the operation record data in the game handle ends; after the learning is completed, and it is back to execute step S1 again; if it is identified that AI is not pressed, the key value data are read and transmitted to the data transmission port of the game handle, meanwhile the key value data are written in the FLASH memory, and the process returns to step S4 again.

When the user ends using the game handle, the timer stops timing, and at this time, the operation record data of the game handle at the end time are scanned.

The user ends the operation, the timer stops timing, and it is identified according to the preset time whether the user presses the AI key at the end, thereby facilitating the FLASH to block and record the data.

When the user pauses using the game handle, for example, for two minutes, and the block time preset by the timer is less than two minutes, it is identified that the user ends using the game handle. At this time, the AI key ends storage of operation records of the game handle this time, and the FLASH memory records the operation data in real time.

When the game is over, the operation records recorded by the AI key have been stored in the control chip in real time, and the FLASH tracks and records operation records of the user in real time.

The present application provides a self-learning file transmitting apparatus of a game handle, which comprises the game handle, and the game handle is provided with an AI key, wherein the AI key is used to execute steps of the self-learning file transmitting method of the game handle according to any one of the claims 1 to 8.

Figure 4:
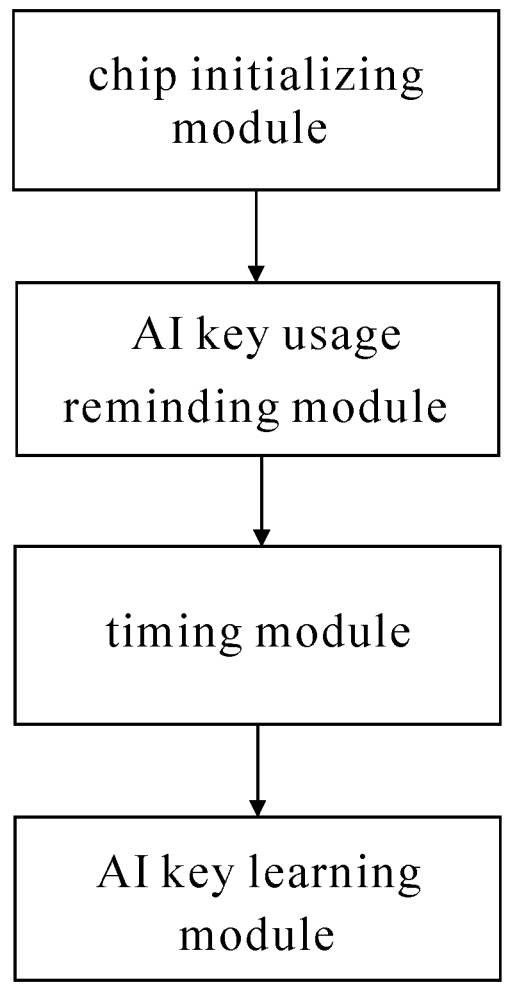
FIG. 4 is a schematic diagram showing an execution module of the AI key according to the present application.

As shown in FIG. 3 and FIG. 4, while operating an intelligent game handle, the user uses the AI key to record operation of the game, which can be transmitted to the mobile terminal through the NFC module or the Bluetooth module in the game handle for viewing online.

The AI key in the present embodiment is used for correspondingly executing the above operation flow. When the user uses the game handle for the second time, the corresponding logic mechanism can be triggered, and the user can adjust the operation position where the AI key is installed according to the use and operation habits.

The AI key of the present application can be placed in the middle, left, right or back of the game handle. Therefore, in the present embodiment, there is no limitation on the installation position of the AI key, such that the installation position of the AI key can be specifically adjusted according to feelings and decisions of the user or the experiencer.

Further, the AI key includes:

a chip initializing module for initializing a chip and scanning a key value, wherein a power supply key is activated, the game handle is powered on and each chip in the handle is initialized; keys are scanned for a first time, a key value of each chip of the game handle is read and it is identified whether an AI key is pressed; if the AI key is pressed, it is identified whether a pressing time of the AI key reaches a preset value;

an AI key usage reminding module for erasing a FLASH chip and reminding a user of usage, wherein an erasing operation is performed on the FLASH chip if the pressing time of the AI key reaches the preset value; after erasing, the game handle vibrates once as a reminder of usage;

a timing module for scanning the key value and starting timing, wherein after being reminded by vibrating the game handle, the keys are scanned for a second time, the key value of each chip of the game handle is read and it is identified whether any key is pressed; if any key is pressed, a timer is reset and starts timing; and an AI key learning module for timing and scanning the key value, and forming a reminder showing an end of learning, wherein when the timing period of the timer reaches the preset value, the game handle vibrates to form a reminder showing the end of learning; and storing operation record data by the game handle ends;

the chip initializing module, the AI key usage reminding module, the timing module and the AI key learning module are electrically connected.

The chip initializing module, the AI key usage reminding module, the timing module and the AI key learning module are integrally designed with a circuit board, and the hardware devices of the game handle are comprehensive at present. Therefore, according to the logic used in the present embodiment, the technical implementation of the AI key can be achieved by correspondingly designing the logic circuit.

The AI key can be placed in the middle, left, right or back of the game handle. Therefore, in the present embodiment, there is no limitation on the installation position of the AI key, such that the installation position of the AI key can be specifically adjusted according to feelings and decisions of the user or the experiencer.

In another embodiment solution of the present application, the AI key can be provided with an LED lamp. The LED lamp has a common indicating circuit and installation design, which can be added to prompt a function state of the learning, e.g., the LED lamp flashes at the time of learning, lights all the time at the time of playing back, and turns off at the time of stopping playback. Different colors may be used to indicate different states, e.g., learning is indicated in red light, and the playback is indicated in green light.

As an application of this game handle, the AI key provided on the game handle can realize real-time viewing of the operation record by the communication module such as an NFC module of the game handle after the operation data of the user are stored. The mobile terminal such as the mobile phone carried by the user can be wirelessly connected with the game handle, can receive the operation record and view the operation record of the user online.

Other players or users can view operation records of the previous user for discussion, communication and comparison, so as to improve the interactivity among users of the game handle.

In order to improve the user's experience and communication among the users, it can be virtualized as a U disk by the game handle, such that the user can copy the backup and the communication freely, and can also copy it into and use it at any time.

Embodiment 3

The game handle transmits the learning data to the APP of the mobile terminal through a wireless channel such as Bluetooth or NFC, thereby facilitating the user to back up, transmit it to friends and publish it to the network at any time.

In an implementation, the existing handle can enter a reading and writing data mode by the combination of keys;

an individual key is added to enter the reading and writing mode;

the data can be read and written at any time by using the mobile APP without needing any key.

The present application can be implemented in the following manner.

The present application provides a self-learning and data reading and writing method of a game handle, comprising steps of:

S1: initializing a chip and scanning a key value, wherein a power supply key is activated, the game handle is powered on and each chip in the handle is initialized; the keys are scanned for a first time, a key value of each key of the game handle is read and it is identified whether an AI key is pressed; if the AI key is pressed, it is identified whether the AI key and a setting key of the game handle are pressed simultaneously;

S2: switching a U disk to perform reading and writing, wherein if it is identified that the AI key and the setting key of the game handle are pressed simultaneously, the USB interface is switched to a U disk enumeration mode, and the computer terminal is used to read and write key value data in a FLASH memory;

S3: completing reading records, and ending scanning of the key value, wherein reading and writing of key value data of the FLASH memory are completed at the computer terminal, the key value of the AI key is re-scanned, and it is identified whether a power ON/OFF key, the setting key and a learning key are pressed; if the power ON/OFF key, the setting key and the learning key are pressed, shut down, and if at least one of the power ON/OFF key, the setting key and the learning key is not pressed, it is back to perform S2 again.

Figure 7:
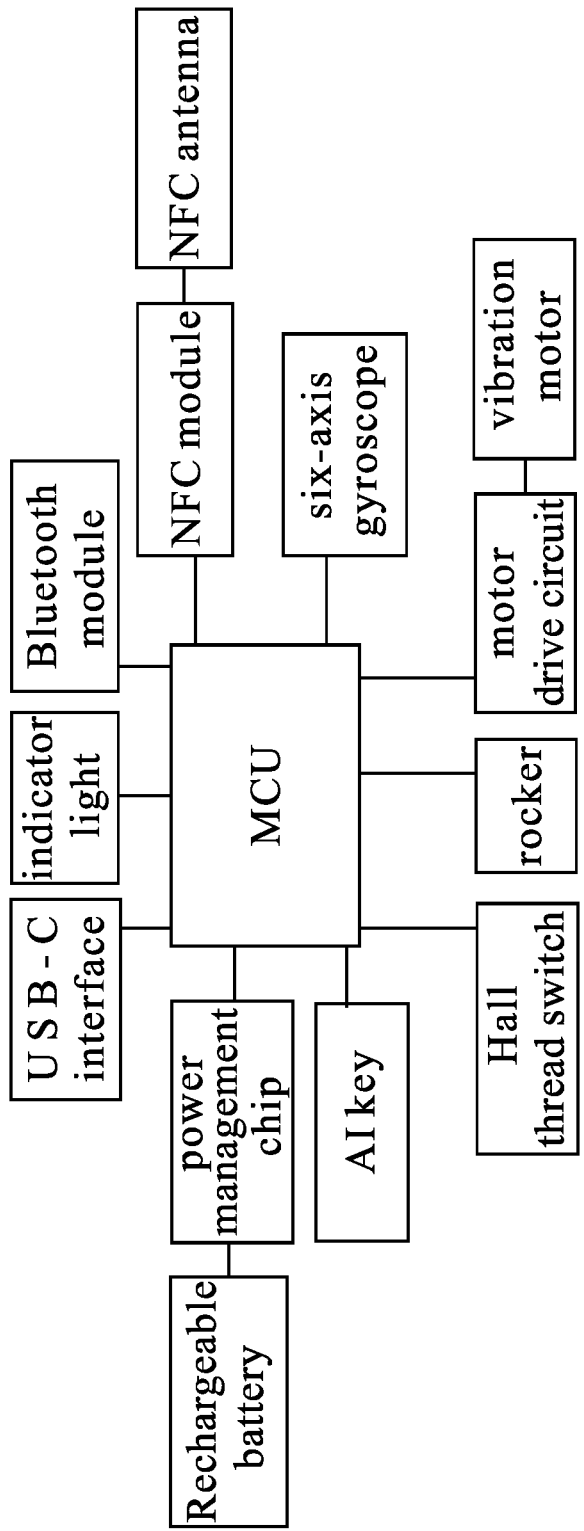
FIG. 7 is a schematic diagram showing a structure of a module of a self-learning and data reading and writing apparatus of a game handle according to the present application.

The schematic diagram showing structures of a module of the self-learning file transmitting apparatus of the game handle as shown in FIG. 7 includes a schematic diagram of hardware constitution of the game handle, wherein the game handle includes a controller MCU as a central integrated control chip in the game handle which is electrically connected to other hardware devices including a USB-C interface, an indicator light, a Bluetooth module, a NFC module and a NFC antenna, a 6-axis gyroscope, a motor drive circuit and a vibration motor, a rocker, a hall thread switch, an AI key, power management, a rechargeable battery, etc. The above-mentioned hardware devices are integrated in the game handle, which are the existing market application game and hardware devices. Therefore, the module structure of the game handle will not be described herein.

Similarly, the control chip and the control circuit used in the above-mentioned hardware devices are also well-known in the art, and thus will not be described herein.

Figure 5:
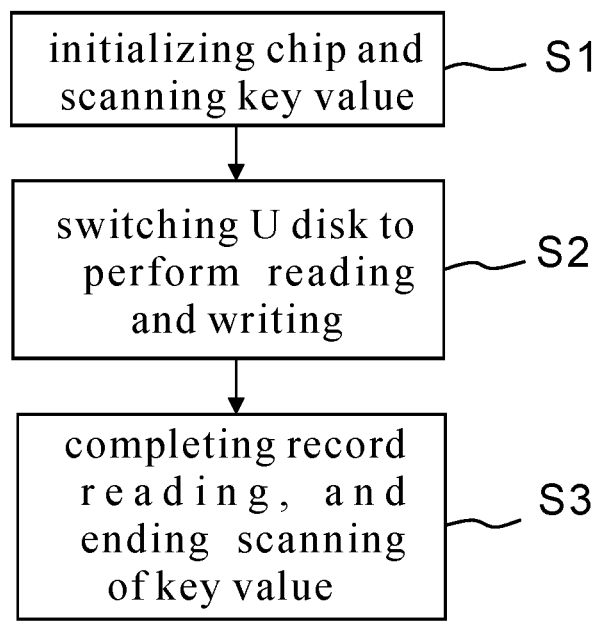
FIG. 5 is a schematic diagram showing steps for performing self-learning and reading and writing data by a game handle according to the present application.
Figure 6:
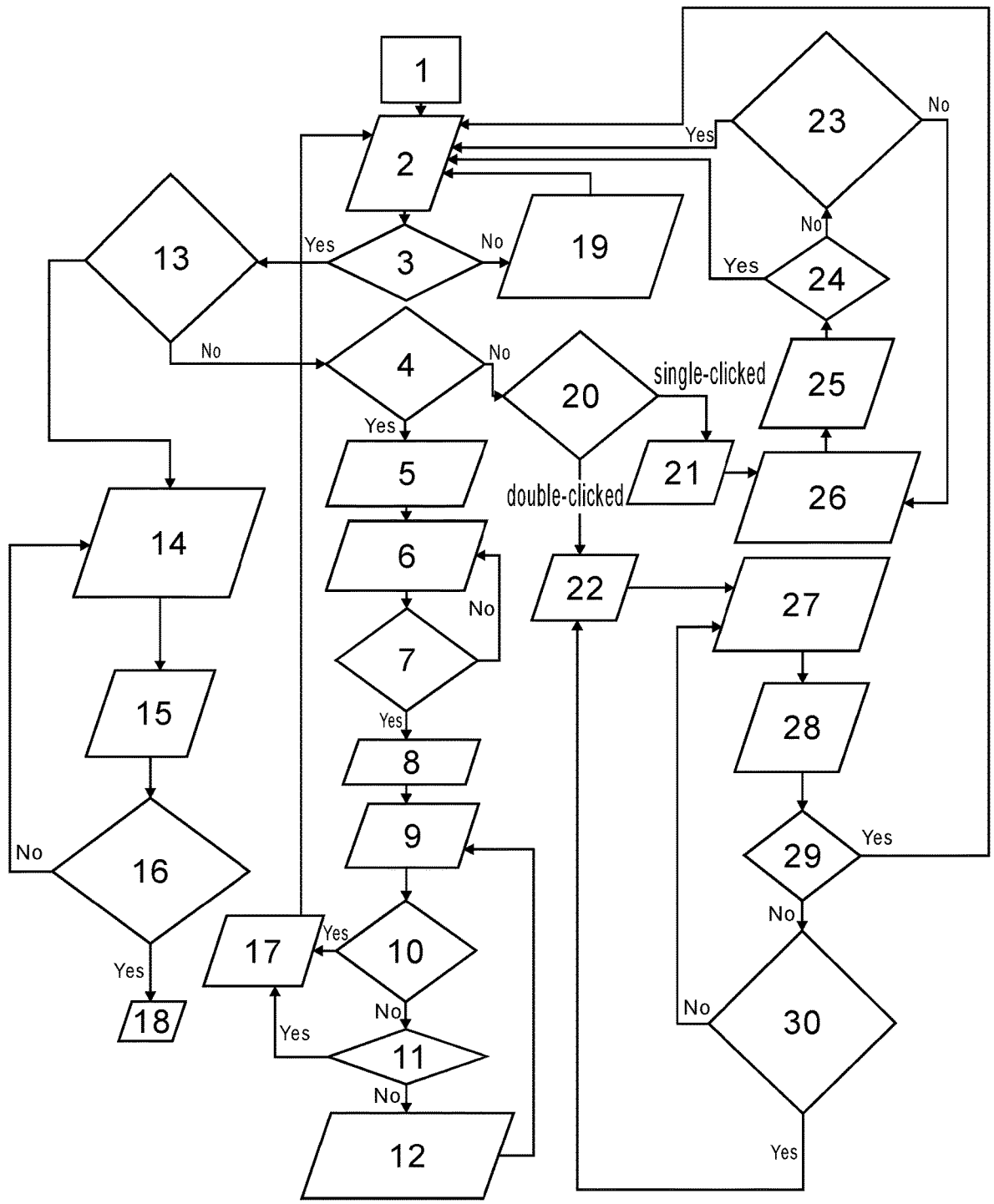
FIG. 6 is a flow diagram showing the logic to perform self-learning and reading and writing data by the AI key according to the present application.

The flow diagram and the logic executed by the AI key are shown in FIG. 5 and FIG. 6, respectively.

In order to simply the flow diagram of FIG. 6, the texts in each box are denoted by a reference numeral. The texts denoted by the reference numeral in each box of FIG. 6 are listed in Table 2.

TABLE 2

| Reference numeral | Texts denoted by the reference numeral |
|---|---|
| 1 | powering on and initializing each chip |
| 2 | scanning key, reading key values of key, rocker and so on |

TABLE 2-continued

| Reference numeral | Texts denoted by the reference numeral |
|---|---|
| 3 | whether AI key is pressed? |
| 4 | whether AI key is pressed for 3 seconds? |
| 5 | erasing FLASH chip, completing erasing and long-vibrating once to form a reminder |
| 6 | scanning and reading numerical values of key, rocker and so on |
| 7 | whether any key is pressed? |
| 8 | resetting time0 of timer and starting timing |
| 9 | scanning and reading numerical values of key, rocker and so on |
| 10 | whether time0 of timer reaches preset value? |
| 11 | whether AI key is pressed? |
| 12 | reading key value data of key, rocker and so on, transmitting to USB port or Bluetooth port and meanwhile writing into FLASH memory |
| 13 | whether AI key and setting key are pressed simultaneously? |
| 14 | switching USB interface to U-disk enumeration mode, FLASH content being storage space, which can be read and written by computer |
| 15 | scanning key, reading key values of key, rocker and so on |
| 16 | whether power switch or setting key and learning key are pressed? |
| 17 | short-vibrating once to form reminder showing end of learning |
| 18 | shutting down |
| 19 | reading key value data of key, rocker and so on, transmitting to USB port or Bluetooth port and meanwhile writing into FLASH memory |
| 20 | Is AI key single-clicked or double-clicked? |
| 21 | initializing at pointer position of FLASH |
| 22 | initializing at pointer position of FLASH |
| 23 | moving pointer position of FLASH backward for specified length and identifying whether pointer position data is FF? |
| 24 | whether key is pressed? |
| 25 | scanning and reading numerical values of key, rocker and so on |
| 26 | reading data stored in FLASH, transmitting data to output ports such as USB port or Bluetooth port |
| 27 | reading data stored in FLASH, transmitting data to output ports such as USB port or Bluetooth port |
| 28 | scanning and reading numerical values of key, rocker and so on |
| 29 | whether key is pressed? |
| 30 | moving pointer position of FLASH backward for specified length and identifying whether pointer position data is FF? |

Before starting the self-learning, the game handle is connected to the power supply, and the power management chip inside the game handle starts to operate to wake up chips of other operating modules.

In the present embodiment, the control chip MCU is the model of GC341, and the control circuit used by the corresponding AI key is assembled with a Schottky diode. The control ports of the AI key are data interfaces such as SELECT, STRAT, AI, SWD/C, A-KEY, etc., and are correspondingly connected to the corresponding port of the control chip MCU.

When the AI key is operated for the first time, the initialization setting of the chip is performed. When the key is pressed for the preset time, the original record data in the chip are eliminated and zeroed. The control chip MCU collects in real time and stores operation records of the AI key. It is convenient for the next user to directly obtain operation records of the previous user, so that the later user can correspondingly adjust control modes of the game handle in combination with operation records of the previous player for the game handle, such that the users have a comparative way to play.

In the present embodiment, when a clicking operation is performed by clicking the AI key, the control switch corresponding to the circuit make signals at the circuit port of the control chip MCU change. When the pressing time of the AI key reaches three seconds, erasing the memory data of the FLASH chip is completed. At this time, the game handle generates a long vibration once to form a reminder for the user to start using the handle, and start recording and storing operation records of the game handle.

When the user starts using the game handle, the control chip reads numerical values of the hardware devices such as keys, rockers and gyroscopes in the internal chip of the game handle again. During the whole process of operating and using the game handle and clicking the AI key by the user, the operation records are continuously scanned in real time, and the operation records are stored.

When the user uses the game handle, the keys of the game handle are scanned at a specified time, and complete data of the game handle are transmitted to the game console at each scanning. When it is needed to view the operation data of the previous user, the data can be directly taken and viewed from the game console.

In the present embodiment, it is an object to perform logical identification according to the clicking states of the AI key and the setting key by the user. If the user clicks the AI key and the setting key of the game handle simultaneously while operating and using the game handle, it enters the U disk to perform reading and writing. If it is identified that the AI key and the setting key of the game handle are pressed simultaneously, the USB interface is switched to a U-disk enumeration mode, and the mobile terminal is used to read and write key value data in the FLASH memory.

In the present embodiment, the keys of the game handle are scanned once at a specified time, and then one frame of complete data is transmitted to the game console once. Therefore, the data are recorded at a fixed time interval, the data at frame by frame are written in sequence, and the data at frame by frame are read out in sequence at the fixed time interval.

For example, the time interval is 10 MS, and one frame of data are 32 bytes, so that there is no error in reading and writing. The special record data include all data of the handle, including but not limited to data of keys, rockers, gyroscopes, Hall sensors, etc.

As shown in FIG. 6, the flow diagram shows shutting down after completion of reading and writing in the U-disk mode, and the process can also restore to the normal operating mode after completion of reading and writing in the U-disk mode, which are just different choices in logic.

Further, identifying whether the AI key is pressed further includes: reading current key value data by the chip in S1, transmitting the data encoded by the game handle to the receiving device through the data transmission port of the game handle, and re-scanning the key value, when it is identified that the AI key is not pressed.

When it is identified that the AI key is not pressed, the controller chip rereads data of device, such as the current key, the rocker and so on, transmits the data encoded by the game handle at this time to the output port such as the USB port or the Bluetooth, transmits the re-scanned data to the control chip, so as to make the control chip to re-scan the data and perform identification until it is identified that the AI key is pressed by the user.

Furthermore, it is identified whether the AI key and the setting key of the game handle are pressed simultaneously. If the AI key and the setting key of the game handle are not pressed simultaneously, it is identified whether the pressing time of the AI key reaches the preset value; if the pressing time of the AI key does not reach the preset value, it is identified whether the AI key is single-clicked or double-clicked; after the identification of the clicking state is completed, the initialization setting is performed at the pointer position of the FLASH.

The clicking time of the AI key in the present embodiment is set as three seconds. If it is detected that the clicking time of the key does not reach three seconds, it is identified whether there is a single click for a long time or multiple clicks for a short time in this process. If the detected clicking state does not meet the preset time, the click state is identified, the pointer position of the FLASH is reset according to the clicking state, the previous operation records are re-erased and the invalid memory is deleted.

The logic steps of clearing the operation memory of the AI key selected according to different clicking states of the user are as follows: cleaning the stored operation records according to the initialization of the FLASH, re-scanning data of the devices such as keys, rockers and gyroscopes, transmitting the data to the output port, and re-scanning by the control terminal. The above steps are repeated.

When it is identified that the AI key is single-clicked, the initialization setting is performed at the pointer position of the FLASH; operation record data stored in the FLASH are read and the operation record data are transmitted to the processing chip through the data transmission port of the game handle to scan the key value; and the process returns to step S1 if the scanning shows that a key is pressed.

If the scanning shows that no key is pressed, the pointer of the FLASH is moved backward for a specified length and it is identified whether the pointer position of the FLASH is FF. If it is identified that the pointer position of the FLASH is FF, the process returns to step S1, and if it is identified that the pointer position of the FLASH is not FF, the operation record data stored in the FLASH are read, and the operation record data are transmitted to the processing chip through the data transmission port of the game handle to scan the key value.

When it is identified that the AI key is double-clicked, the initialization setting is performed at the pointer position of the FLASH; operation record data stored in the FLASH are read and the operation record data are transmitted to the processing chip through the data transmission port of the game handle to scan the key value; and the process returns to step S1 if the scanning shows that a key is pressed.

If the scanning shows that no key is pressed, the pointer of the FLASH is moved backward for a specified length and it is identified whether the pointer position of the FLASH is FF. If it is identified that the pointer position of the FLASH is FF, the initialization setting is performed at the pointer position of the FLASH, and if it is identified that the pointer position of the FLASH is not FF, the operation record data stored in the FLASH are read, and the operation record data are transmitted to the receiving device through the data transmission port of the game handle.

Further, in step S4, it is identified whether AI is pressed if the timing period of the timer does not reach the preset value; if it is identified that AI is pressed, the handle vibrates to form a reminder showing the end of learning, and storing the operation record data by the game handle ends; after learning, the process proceeds to step S1 again; if it is identified that AI is not pressed, the key value data are read and transmitted to the data transmission port of the game handle, and meanwhile the key value data are written to the FLASH memory such that the process returns to step S4 again.

When the user ends using the game handle, the timer stops timing, and at this time, the operation record data of the handle at the end time are scanned.

The user ends the operation, the timer stops timing, and it is identified according to the set preset time whether the user presses the AI key at the end, thereby facilitating the FLASH to block and record the data.

When the user pauses using the game handle, for example, for two minutes, and the block time preset by the timer is less than two minutes, it is identified that the user ends using the game handle. At this time, the AI key ends storage of operation records of the game handle this time, and the FLASH memory records the operation data in real time.

When the game is over, the operation records recorded by the AI key have been stored in the control chip in real time, and the FLASH tracks and records operation records of the user in real time.

The present application provides a self-learning and data reading and writing apparatus of a game handle, which comprises the game handle, and the game handle is provided with an AI key, wherein the AI key is used to execute steps of the self-learning and data reading and writing method of the game handle.

Figure 8:
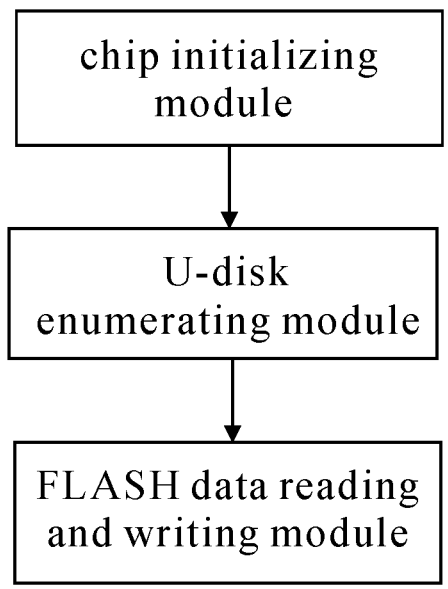
FIG. 8 is a schematic diagram showing an execution module of the AI key according to the present application.

As shown in FIG. 7 and FIG. 8, while operating an intelligent game handle, the user uses the AI key to record operation of the game, which can be transmitted to the mobile terminal through the NFC module or the Bluetooth module inside the game handle for viewing online.

The AI key in the present embodiment correspondingly executes the above operation flow. When the user uses the game handle for the second time, the corresponding logic mechanism can be triggered, and the user can adjust the operation position where the AI key is installed according to the use and operation habits.

The AI key can be placed in the middle, left, right or back of the handle. Therefore, in the present embodiment, there is no limitation on the installation position of the AI key, such that the installation position of the AI key can be specifically adjusted according to feelings and decisions of the user or the experiencer.

Further, the AI key includes:

a chip initializing module for initializing a chip and scanning a key value, wherein a power supply key is activated, the handle is powered on and each chip in the handle is initialized; the keys are scanned for a first time, a key value of each chip of the handle is read and it is identified whether an AI key is pressed; if the AI key is pressed, it is identified whether the AI key and a setting key of the game handle are pressed simultaneously;

a U-disk enumerating module for switching the USB interface to the U disk to perform reading and writing, wherein on the basis of the chip initializing module, if it is identified that the AI key and the setting key of the game handle are pressed simultaneously, the USB interface is switched to a U-disk enumeration mode, and the computer terminal is used to read and write key value data in a FLASH memory;

a FLASH data reading and writing module for reading record data and ending scanning the key value; re-scanning the key value of the key after completion of reading and writing key value data of the FLASH memory at the computer terminal, and identifying whether the power ON/OFF key, the setting key and the learning key are pressed; shutting down if these keys are pressed, and performing the operation again by the U-disk enumerating module if these keys are not pressed;

the chip initializing module, the U-disk enumerating module and the FLASH data reading and writing module are electrically connected in sequence.

The chip initializing module, the U-disk enumerating module and the FLASH data reading and writing module are integrated with a circuit is board, and the hardware devices of the game handle are comprehensive at present. Therefore, according to the logic used in the present embodiment, the technical implementation of the AI key can be achieved by correspondingly designing the logic circuit.

The AI key can be placed in the middle, left, right or back of the handle. Therefore, in the present embodiment, there is no limitation on the installation position of the AI key, such that the installation position of the AI key can be specifically adjusted according to feelings and decisions of the user or the experiencer.

In another embodiment, the AI key can be provided with an LED lamp. The LED lamp has a common indicating circuit and installation design, which can be added to prompt a function state of the learning, e.g., the LED lamp flashes at the time of learning, lights all the time at the time of playing back, and turns off at the time of stopping playback. Different colors may be used to indicate different states, e.g., learning is indicated in red light, and playback is indicated in green light.

As an application of this game handle, the AI key provided on the game handle can realize real-time viewing of the operation record by the communication module such as an NFC module of the game handle after the operation data of the user are stored. The mobile terminal such as the mobile phone carried by the user can be wirelessly connected with the game handle, can receive the operation record and view the operation record of the user online.

Other players or users can view operation records of the previous user for discussion, communication and comparison, so as to improve the interactivity among users of the game handle.

In order to improve the user's experience and communication among the users, it can be virtualized as a U disk by the handle, such that the user can copy the backup and the communication freely, and can also copy it into and use it at any time.

Embodiment 4

The game handle transmits the learning data to the APP of the mobile terminal through a wireless channel such as Bluetooth or NFC, thereby facilitating the user to back up, transmit it to friends and publish it to the network at any time.

In an implementation, the existing handle can enter a reading and writing data mode by the combination of keys;

an individual key is added to enter the reading and writing mode;

the data can be read and written at any time by using the mobile APP without needing any key.

The present application can be implemented in the following manner:

at the present application provides a file self-learning and APP communication reading and writing method of the game handle, comprising steps of:

S1: initializing a chip, scanning a key value and identifying APP communication requirements, wherein a power supply key is activated, the handle is powered on and each chip in the handle is initialized; the keys are scanned for a first time, a key value of each chip of the handle is read, meanwhile it is identified whether an APP Bluetooth module is required to transmit files; if the APP Bluetooth module is required to transmit files, data in the FLASH are read and written according to APP control signals; it is identified whether reading and writing are completed after data are read, re-scanning is performed upon completion of reading and writing, and the data in the FLASH are read and written again according to APP control signals if reading and writing are not completed;

S2: erasing a FLASH chip if transmission of files is not required and forming a reminder of usage, wherein in step S1, the APP Bluetooth module is not required to transmit files, and it is identified whether the AI key is pressed; if the AI key is pressed, it is identified whether a pressing time of the AI key reaches a preset value; an erasing operation is performed on the FLASH chip if the pressing time of the AI key reaches the preset value; after erasing, the game handle vibrates once to form a reminder of usage;

S3: scanning a key value and starting timing, wherein after forming the reminder of usage, the keys are scanned for a second time, the key value of each key in the game handle is read and it is identified whether any key is pressed; if any key is pressed, a timer is reset and starts timing;

S4: timing and scanning the key value, and forming a reminder showing an end of learning, wherein when the timing period of the timer reaches the preset value, the handle vibrates to form a reminder showing the end of learning, and storing operation record data by the game handle ends; after learning, it is back to perform step S1 again.

Figure 11:
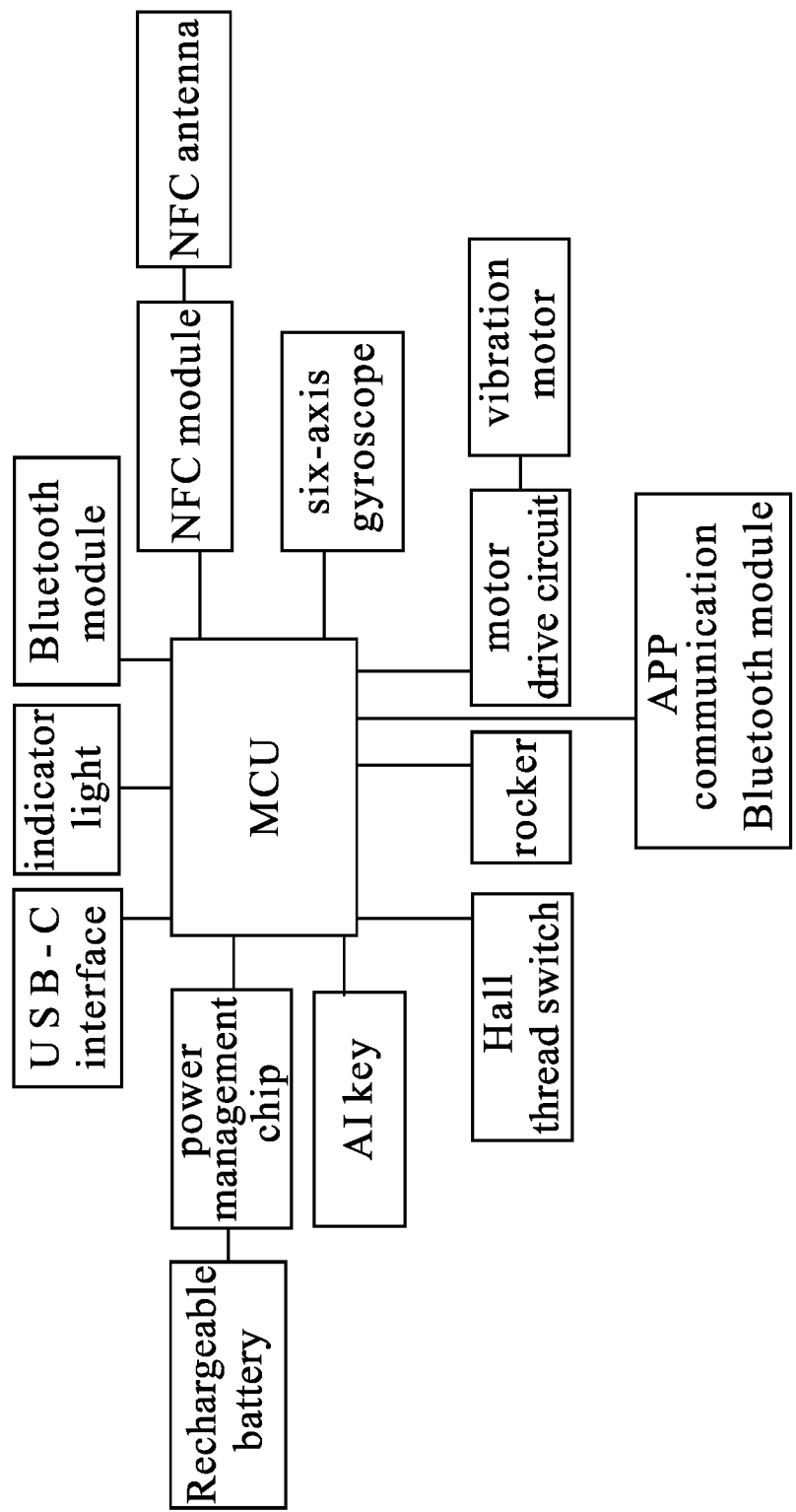
FIG. 11 is a schematic diagram showing a structure of a module of a file self-learning and APP communication reading and writing apparatus of a game handle according to the present application.

The schematic diagram showing structures of a module of a file self-learning and APP communication reading and writing apparatus of the game handle as shown in FIG. 11 includes a schematic diagram of hardware constitution of the game handle, wherein the game handle includes a controller MCU as a central integrated control chip of the game handle which is electrically connected to other hardware devices of the game handles including a USB-C interface, an indicator light, a Bluetooth module, a NFC module and a NFC antenna, a 6-axis gyroscope, a motor drive circuit and a vibration motor, a rocker, a hall thread switch, an AI key, power management, a rechargeable battery, etc. The above-mentioned hardware devices of the game handle are integrated into one, which are the existing market application game and hardware devices. Therefore, the module structure of the game handle will not be described herein.

Similarly, the control chip and the control circuit used in the above-mentioned hardware devices are also well-known in the art, and thus will not be described herein.

Figure 9:
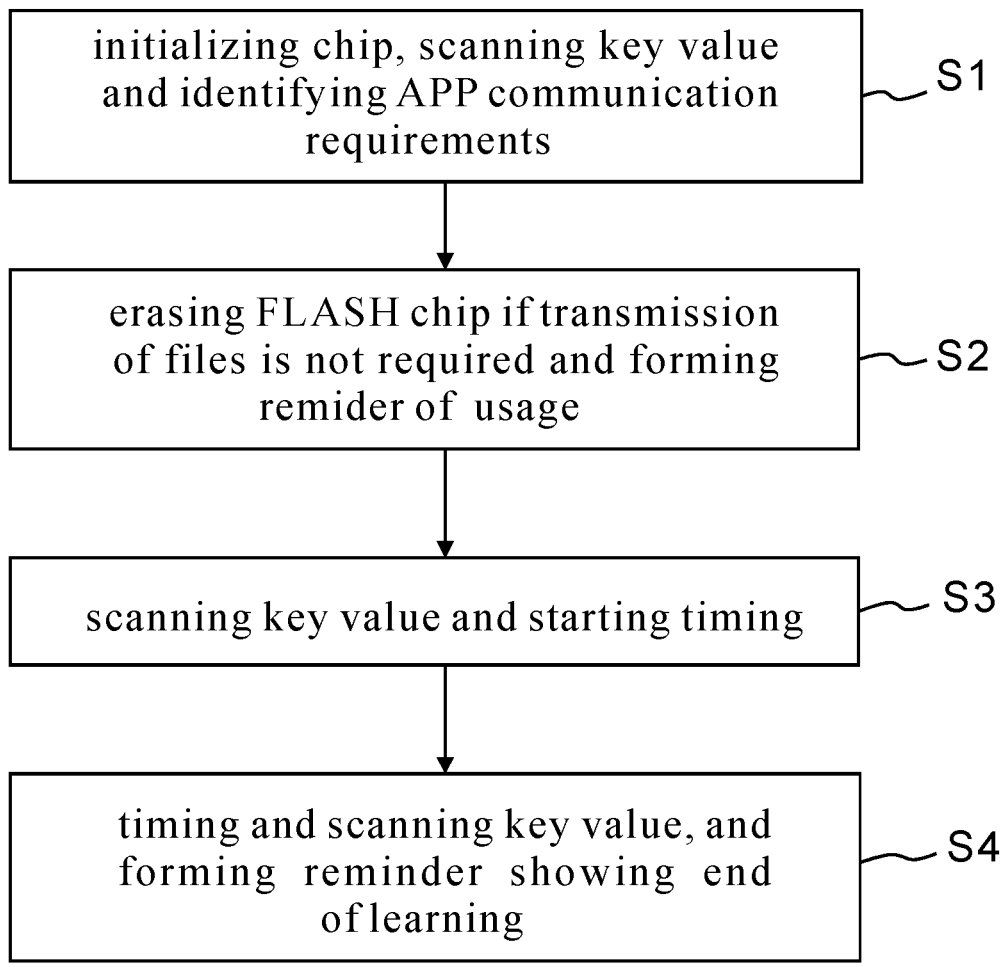
FIG. 9 is a flow diagram showing a method for a file self-learning and reading and writing APP communication according to the present application.
Figure 10:
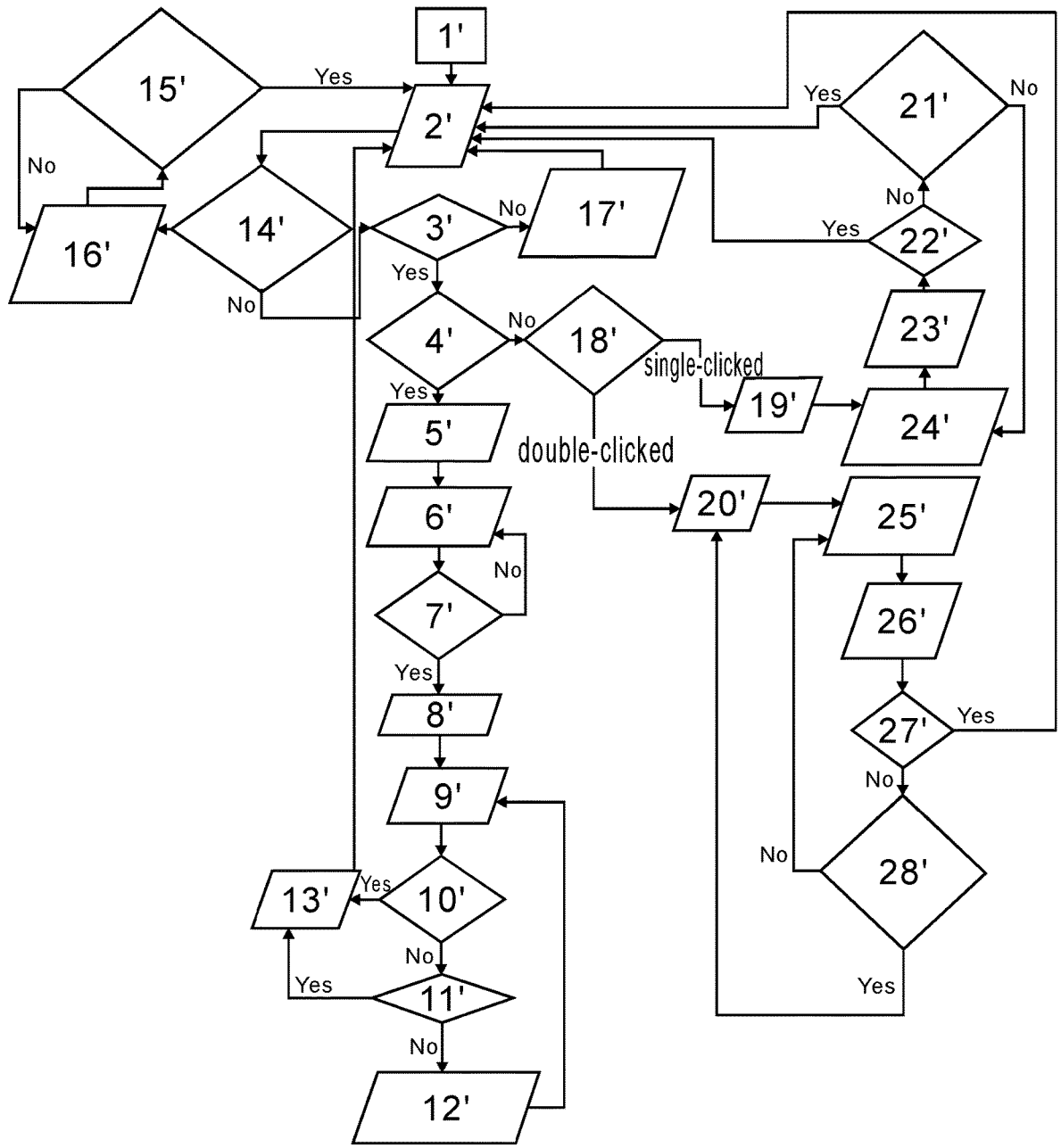
FIG. 10 is a flow diagram showing the logic to perform file self-learning and reading and writing APP communication by the AI key according to the present application.

The flow diagram and the logic executed by the AI key are shown in FIG. 9 and FIG. 10, respectively.

In order to simply the flow diagram of FIG. 10, the texts in each box are denoted by a reference numeral. The texts denoted by the reference numeral in each box of FIG. 10 are listed in Table 3.

TABLE 3

| Reference numeral | Texts denoted by the reference numeral |
| --- | --- |
| 1' | powering on and initializing each chip |
| 2' | scanning key, reading key values of key, rocker and so on |
| 3' | whether AI key is pressed? |
| 4' | whether AI key is pressed for 3 seconds? |
| 5' | erasing FLASH chip, completing erasing and long-vibrating once to form a reminder |
| 6' | scanning and reading numerical values of key, rocker and so on |

TABLE 3-continued

| Reference numeral | Texts denoted by the reference numeral |
| --- | --- |
| 7' | whether any key is pressed? |
| 8' | resetting time0 of timer and starting timing |
| 9' | scanning and reading numerical values of key, rocker and so on |
| 10' | whether time0 of timer reaches preset value? |
| 11' | whether AI key is pressed? |
| 12' | reading key value data of key, rocker and so on, transmitting to USB port or Bluetooth port and meanwhile writing into FLASH memory |
| 13' | short-vibrating once to form reminder showing end of learning |
| 14' | whether APP Bluetooth module is required to transmit files? |
| 15' | reading APP reading and writing sign transmitted by APP Bluetooth module. Whether reading and writing are completed? |
| 16' | reading and writing FLASH data according to APP control signals, powering and initializing each chip |
| 17' | reading key value data of key, rocker and so on, transmitting to USB port or Bluetooth port and meanwhile writing into FLASH memory |
| 18' | Is AI key single-clicked or double-clicked? |
| 19' | initializing at pointer position of FLASH |
| 20' | initializing at pointer position of FLASH |
| 21' | moving pointer position of FLASH backward for specified length and identifying whether pointer position data is FF? |
| 22' | whether key is pressed? |
| 23' | scanning and reading numerical values of key, rocker and so on |
| 24' | reading data stored in FLASH, transmitting data to output ports such as USB port or Bluetooth port |
| 25' | reading data stored in FLASH, transmitting data to output ports such as USB port or Bluetooth port |
| 26' | scanning and reading numerical values of key, rocker and so on |
| 27' | whether key is pressed? |
| 28' | moving pointer position of FLASH backward for specified length and identifying whether pointer position data is FF? |

Before starting the self-learning, the game handle is connected to the power supply, and the power management chip inside the game handle starts to operate to wake up chips of other operating modules.

In this embodiment, the control chip MCU is the model of GC341, and the control circuit used in the corresponding AI key is assembled with a Schottky diode. The control ports of the AI key are data interfaces such as SELECT, STRAT, AI, SWD/C, A-KEY, etc., and are correspondingly connected to the corresponding port of the control chip MCU.

When the AI key is operated for the first time, the initialization setting of the chip is performed. When the key is pressed for the preset time, the original record data of the chip are eliminated and zeroed. The control chip MCU collects in real time and stores operation records of the AI key. It is convenient for the next user to directly obtain operation records of the previous user, so that the later users can correspondingly adjust control modes of the game handle in combination with operation records of the previous player for the game handle, such that the users have a comparative way to play.

In the present embodiment, when a clicking operation is performed by clicking the AI key, the control switch corresponding to the circuit make signals at the circuit port of the control chip MCU change. When the pressing time of the AI key reaches three seconds, erasing of memory data of the FLASH chip is completed. At this time, the game handle generates a long vibration once to remind the user of using the game handle, and start recording and storing operation records of the game handle.

When the user starts using the game handle, the control chip reads numerical values of the hardware devices such as keys, rockers and gyroscopes in the internal chip of the game handle again. During the whole process of operating and using the game handle and clicking the AI key by the user, the operation records are continuously scanned in real time, and the operation records are stored.

When the user uses the game handle, the keys of the game handle are scanned at a specified time, and complete data of the game handle are transmitted to the game console at each scanning. When it is needed to view the operation data of the previous user, data can be directly taken and viewed from the game console.

Further, identifying whether the AI key is pressed further includes: reading, when it is identified that the AI key is not pressed, the current key value data by the processing chip in step S1, transmitting the data encoded by the game handle to the receiving device through the data transmission port of the game handle, and re-scanning the key value. The receiving device includes but is not limited to a game console or a PC machine.

When it is identified that the AI key is not pressed, the controller chip rereads data of devices such as the current key, the rocker and so on, transmits the data encoded by the game handle at this time to the output port such as the USB port or the Bluetooth, transmits the re-scanned data to the control chip, so as to make the control chip to re-scan the data and perform re-identification until it is identified that the AI key is pressed by the user.

Further, if the pressing time of the AI key does not reach the preset value, it is identified whether the AI key is single-clicked or double-clicked; after the identification of the clicking state is completed, the initialization setting is performed at the pointer position of the FLASH.

The clicking time of the AI key in the present embodiment is set as three seconds. If it is detected that the clicking time of the key does not reach three seconds, it is identified whether there is a single click for a long time or multiple clicks for a short time in this process. If the detected clicking state does not meet the preset time, the clicking state is identified, the pointer position of the FLASH is reset according to the clicking state, the previous operation records are re-erased and the invalid memory is deleted.

The logic steps of clearing the operation memory of the AI key selected according to different clicking states of the user are as follows: cleaning the stored operation records according to the initialization of the FLASH, re-scanning data of the devices such as keys, rockers and gyroscopes, transmitting the data to the output port, and re-scanning by the control terminal. The above steps are repeated.

When it is identified that the AI key is single-clicked, the initialization setting is performed at the pointer position of the FLASH in the processing chip; operation record data stored in the FLASH are read by the processing chip and the operation record data are transmitted to the receiving device through the data transmission port of the game handle; and the process returns to step S1 if the scanning shows that a key is pressed.

If the scanning shows that no key is pressed, the pointer of the FLASH is moved backward for a specified length and it is identified whether the pointer position of the FLASH is FF. If it is identified that the pointer position of the FLASH is FF, the process returns to step S1, and if it is identified that the pointer position of the FLASH is not FF, the operation record data stored in the FLASH are read, and the operation record data are transmitted to the receiving device through the data transmission port of the game handle.

When it is identified that the AI key is double-clicked, the initialization setting is performed at the pointer position the FLASH in the processing chip; operation record data stored in the FLASH are read and the operation record data are transmitted to the receiving device through the data transmission port of the game handle; and the process returns to step S1 if the scanning shows that a key is pressed.

If the scanning shows that no key is pressed, the pointer of the FLASH in the processing chip will be moved backward for a specified length and it is identified whether the pointer position of the FLASH is FF. If it is identified that the pointer position of the FLASH is FF, the initialization setting is performed at the pointer position of the FLASH, and if it is identified that the pointer position of the FLASH is not FF, the operation record data stored in the FLASH are read, and the operation record data are transmitted to the receiving device through the data transmission port of the game handle.

Further, in step S4, it is identified whether AI is pressed if the timing period of the timer does not reach the preset value; if it is identified that AI is pressed, the handle vibrates to form a reminder showing the end of learning, and storing the operation record data by the handle ends; after learning, the process proceeds to step S1 again; if it is identified that AI is not pressed, the key value data are read and transmitted to the data transmission port of the game handle, meanwhile the key value data are written to the FLASH memory, and the process returns to step S4 again.

When the user ends using the game handle, the timer stops timing, and at this time, the operation record data of the game handle at the end time are scanned.

The user ends the operation, the timer stops timing, and it is identified according to the set preset time whether the user presses the AI key at the end, thereby facilitating the FLASH to block and record the data.

When the user pauses using the game handle, for example, for two minutes, and the block time preset by the timer is less than two minutes, it is identified that the user ends using the game handle. At this time, the AI key ends storage of operation records of the game handle this time, and the FLASH memory records the operation data in real time.

When the game is over, the operation records recorded by the AI key have been stored in the control chip in real time, and the FLASH tracks and records operation records of the user in real time.

The present application provides a file self-learning and APP communication reading and writing apparatus of a game handle, which comprises the game handle, and the game handle is provided with an AI key, wherein the AI key is used to execute steps of the file self-learning and APP communication reading and writing method of the game handle according to any one of the claims 1 to 8; further comprises an APP Bluetooth module, wherein the APP Bluetooth module reads FLASH data according to APP control signals.

Figure 12:
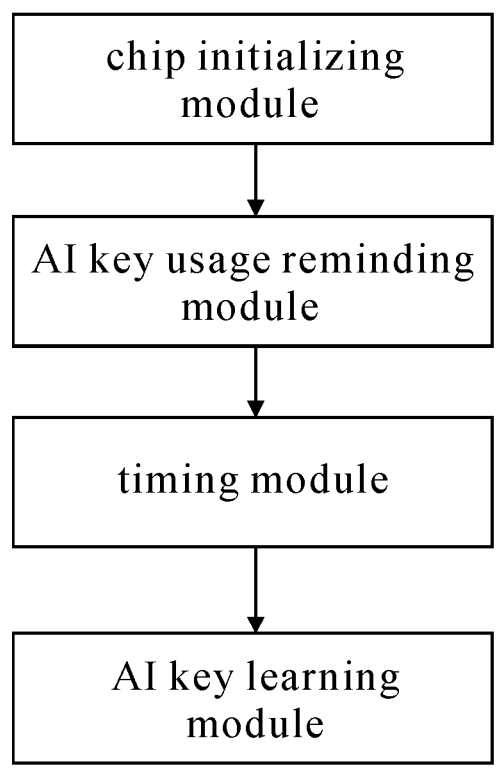
FIG. 12 is a schematic diagram showing an execution module of the AI key according to the present application.

As shown in FIG. 11 and FIG. 12, while operating an intelligent game handle, the user uses the AI key to record operation of the game, which can be transmitted to the mobile terminal through the NFC module or the Bluetooth module inside the game handle for viewing online.

In the present embodiment, a set of Bluetooth module is added separately on the basis of the original one. In order to read and write data in the FLASH by the mobile APP, the function of restoring the game handle can be recorded after completion of reading and writing, without switching modes of the game handle. This significantly facilitates the use of the game handle. The mobile APP can read and write data with the learning function.

The AI key in the present embodiment correspondingly executes the above operation flow. When the user uses the game handle for the second time, the corresponding logic mechanism can be triggered, and the user can adjust the operation position where the AI key is installed according to the use and operation habits.

The AI key can be placed in the middle, left, right or back of the handle. Therefore, in the present embodiment, there is no limitation on the installation position of the AI key, such that the installation position of the AI key can be specifically adjusted according to feelings and decisions of the user or the experiencer.

Further, the AI key includes:

a chip initializing module for initializing a chip and scanning a key value, wherein a power supply key is activated, the handle is powered on and each chip in the handle is initialized; the keys are scanned for a first time, a key value of each key in the handle is read and it is identified whether an AI key is pressed; if the AI key is pressed, it is identified whether a pressing time of the AI key reaches a preset value;

an AI key usage reminding module for erasing a FLASH chip and reminding a user of using the game handle, wherein an erasing operation is performed on the FLASH chip if the pressing time of the AI key reaches the preset value; after erasing, the handle vibrates once to as a reminder of usage;

a timing module for scanning the key value and starting timing, wherein after forming the reminder, the keys are scanned for a second time and the key value of each key in the game handle is read and it is identified whether any key is pressed; if any key is pressed, a timer is reset and starts timing; and an AI key learning module for timing and scanning the key value, and forming a reminder showing an end of learning, wherein the timing period of the timer reaches the preset value, the game handle vibrates to form a reminder showing the end of learning, and storing operation record data by the game handle ends;

the chip initializing module, the AI key usage reminding module, the timing module and the AI key learning module are electrically connected.

The chip initializing module, the AI key usage reminding module, the timing module and the AI key learning module are integrated with a circuit board, and the hardware devices of the game handle are comprehensive at present. Therefore, according to the logic used in the present embodiment, the technical implementation of the AI key can be achieved by correspondingly designing the logic circuit.

The AI key can be placed in the middle, left, right or back of the handle. Therefore, in the present embodiment, there is no limitation on the installation position of the AI key, such that the installation position of the AI key can be specifically adjusted according to feelings and decisions of the user or the experiencer.

In another embodiment, the AI key can be provided with an LED lamp. The LED lamp has a common indicating circuit and installation design, which can be added to prompt a function state of the learning, e.g., the LED lamp flashes at the time of learning, lights all the time at the time of playing back, and turns off at the time of stopping playback. Different colors may be used to indicate different states, e.g., learning is indicated in red light, and playback is indicated in green light.

As an application of this game handle, the AI key provided on the game handle can realize real-time viewing of the operation record by the communication module such as an NFC module of the game handle after the operation data of the user are stored. The mobile terminal such as the mobile phone carried by the user can be wirelessly connected with the game handle, can receive the operation record and view the operation record of the user online.

Other users can view operation records of the previous user for discussion, communication and comparison, so as to improve the interactivity among users of the game handle.

Embodiment 5

In the present application, after storing the operation record data, the method further comprises the following steps:

S1: identifying whether the learning key of the handle is pressed, wherein the learning key is preset;

S2: obtaining the operation record data and outputting the operation record data as the current operation data of the game handle, when the learning key in the game handle is pressed.

In step S1 of the present embodiment, the state of the learning key can be identified by reading the key value of the game handle. If the key value of the learning key reaches the preset value, it can be identified that the learning key is pressed, wherein a pressure sensor can be provided at the bottom of the learning key to acquire the key value of the learning key.

In step S2 of the present embodiment, when the learning key in the game handle is pressed and the user wants to output the previously stored operation record data, the previously stored operation record data are output as the current operation data.

By the above steps, when the user operates the game handle, the current operation data can be output as the previously stored operation record data. Thus, it can be realized that the complex and previously stored operation records are output as the simple and current operation data, thereby simplifying the operation of the game handle, facilitating the novice players to perform the operation, reducing the difficulty of the game, saving operations of fast keys, complex combination of keys or a large number of repeated leveling, and improving the game experience.

Embodiment 6

The current operation data of the handle are received, and the process is performed based on the operation data to generate corresponding display data, wherein the operation data are correspondingly set in advance with the display data.

In the present embodiment, any control terminal, after receiving the operation data, processes the operation data to obtain display data corresponding to the operation data, wherein the display data are stored at the control terminal in advance.

By the above steps, the control terminal performs the display after receiving the operation data. At this time, since the game handle has the previously stored operation records, the user can simply operate the game handle at the current time (trigger the learning key), i.e., output the complex and previously stored operation records to the control terminal.

By the above manner, the key value can be read at different times and the operation record data input by the user can be stored. When the user uses the game handle at the next time, the previous operation record data of the game handle can be directly output, which solves the problem that the user can only operate the used game handle once and individually without storing the operation record data, thereby achieving the effect of adjusting and controlling the game handle multiple times according to individual use habits. The same display data are displayed at the control terminal by operating different keys of the game handle by the user.

Embodiment 7

The present application further provides a data self-learning method for the operation key.

The present application relates to an operating terminal device, such as a handle, and particularly a game handle. The operating terminal device (such as a game handle) is electrically connected or communicated with a hardware host (such as a game console). The users input instructions (such as game operation instructions) to the hardware host (such as a game console) by the operating terminal device (such as a game handle), and the hardware host (such as a game console) executes the corresponding operation program after receiving the input instructions.

The present application relates to a method of self-learning data of the operation key, and particularly to a method of self-learning stored operation data and outputting operation instructions, comprising the following steps:

S101: reading a key value of an AI key of the game handle, identifying whether the AI key is pressed, and identifying whether a pressing time of the AI key reaches a preset value if the AI key is pressed;

S102: performing an erasing operation on a FLASH memory of the game handle after the pressing time of the AI key reaches the preset value;

S103: scanning and reading a key value of each key of the game handle and identifying whether any key of the handle is pressed at this time;

S104: storing data of the key value read by scanning in the FLASH memory in the game handle.

The key value data of the key stored in the flash memory of the game handle can be used as the operation instruction data, which can be output through the output port of the game handle, e.g., to the hardware host (such as the game console) to execute the operation instructions.

Therefore, the method can further include the steps:

S105: reading key value data of the key stored in the FLASH memory of the game handle, and serving the data as the operation instruction data which are output through the output port of the handle, when a certain condition is present.

More specifically, S101 can further include initializing the game handle, and reading the key value of the AI key of the game handle to identify whether the AI key is pressed after completion of the initialization, wherein it is identified whether the pressing time of the AI key reaches the preset value if the AI key is pressed. For example, a pressure sensor can be provided at the bottom of the key (including AI key) to acquire the key value of the key.

S102 can further include outputting a first reminder by, e.g., long-vibrating the game handle once to remind the user that scanning is to be started and the key record is stored, after the erasing operation on the FLASH memory of the game handle is completed.

S103 can include starting to scan and read the key value of each key of the game handle after the reminder is output, and identifying whether any key of the game handle is pressed at this time.

Embodiment 8

S104 can include scanning data of the key value of the key obtained by reading, wherein on one hand, the data are output in real time as real-time operation instructions through the output port of the game handle, e.g., to the hardware host (such as the game console), and on the other hand, the data are stored in the FLASH memory of the game handle as the operation record data. Thus, the operation process (such as the game operation process) will not be interrupted, wherein on one hand, the operation process is performed in real time on the hardware host (such as the game console) by the operation indicated by the key, and on the other hand, the operation record is stored in the FLASH memory of the game handle.

Further, S104 can further include starting timing by the timer when any key is pressed; scanning and reading data of the key value of the key when the timing period of the timer does not reach the preset value, and storing the data in the FLASH memory in the game handle; ending recording and storing data of the key value after the timing period of the timer reaches the preset value; and meanwhile, selectively outputting a second reminder by, e.g., short-vibrating the game handle once to remind the user of an end of learning/recording. Although the timing period of the timer does not reach the preset value, it is detected by scanning that the AI key is pressed again to end recording and storing of data of the key value, and meanwhile, a second reminder is selectively output by, e.g., short-vibrating the game handle once to remind the user of an end of learning/recording.

More specifically, in step S105, the "the certain condition" for outputting stored data as operation instructions may be various, and the preferable conditions are as follows.

In one implementation, the game handle has an AI storage key and an AI output key. The AI storage key is pressed to start executing scanning and storing of the key value data (operation data) in S101 to S104. The AI output key is pressed to execute S105, and output the key value data of the key stored in the FLASH memory as operation instructions.

In another implementation, the game handle has only one AI key, and all steps in S101 to S105 are controlled by the same AI key, but the trigger conditions are different. For example, when the AI key is pressed for a long time, e.g., the AI key is pressed for more than 3 seconds (3 s), i.e., the AI key is pressed and the pressing time reaches the preset value (such as 3 s), scanning and storing of key value data (operation data) in S101 to S104 are executed. For example, when the AI key is single-clicked and pressed for a short time, i.e., the AI key is pressed but the pressing time does not reach the preset value (such as 3 s), the step S105 is executed, and the key value data of the key stored in the FLASH memory is output as operation instructions.

In this way, the game players reset the FLASH memory by long-pressing the AI key, re-scan and store new operation records. By short-pressing the AI key, one key outputs complex operation instructions stored in the FLASH memory. Thus, the complex combination of keys repeated multiple times is replaced with a simple one-key output of the AI key, thereby reducing the repeated operations and improving user experience of the game players.

Embodiment 9

In the present embodiment, the present application further has the function of continuously and repeatedly outputting the stored operation instructions for multiple times, that is, S105 also further includes repeatedly outputting, when the multiple output conditions are triggered, the key value data of the key stored in the FLASH memory of the game handle as the operation instruction data for multiple times.

For example, the "multiple output condition being triggered" can be set to double-click the "AI output key", or double-click the "AI key" when there is only one AI key. When the AI key (or AI output key) is double-clicked, i.e., the key is pressed twice in a short time and the time interval between two clicks does not exceed the preset value (e.g. does not exceed 0.5 s), the operation data in the FLASH memory are read, and the stored operation data are repeatedly output as the operation instruction for multiple times.

Further, during executing step S105 (reading operation data in the FLASH memory and outputting the operation data as an operation instruction), if it is detected that any key other than the AI key is pressed, the execution of S105 is stopped, and the process leaves from the AI output mode and returns to the state of real-time outputting instructions by the key. No matter single output or repeated multiple outputs are executed in S105, there is a similar solution, leaving from the AI output mode and returning to the state of real-time outputting instructions by the key.

In addition, during executing step S105, if it is detected that the AI key is pressed, the process returns to step S101 and it is identified whether the pressing time of the AI key reaches the preset value.

By such setting, the game players can conveniently switch from the AI output mode to the normal real-time operation mode seamlessly, thereby facilitating to pause/suspend outputting the operation instructions stored in the FLASH automatically.

In the present application, the game handle can learn key records of the user, so as to enable that instructions output by a simple operation of triggering one key are the same as instructions output by a complex operation of triggering multiple keys, thereby enriching use options for the user and improving use experience of the user.

The present application simplifies the operation of the game handle, facilitates the novice players to perform the operation, reduces the difficulty of the game operation, saves operations of fast keys, complex combination of keys or a large number of repeated leveling, and improves the game experience.

By the above manner, the key value can be read and stored as the operation record data input by the user. When the user uses the game handle at the next time, the previous operation record data of the game handle can be directly output as the operation instruction, thereby solving the problem that the user can only operate the used handle once and individually and cannot store and use the operation record data for multiple times, and achieving the effect of adjusting and controlling the game handle multiple times according to personal use habits. In another embodiment, the operating terminal device (such as a handle) of the present application is electrically connected or communicated with a hardware host (such as a game console, a computer host, a mobile phone, etc.), and particularly connected by the USB interface or Bluetooth communication. The game handle has a readable and writable mode, and when the game handle is connected to the hardware host and enters the readable and writable mode, the hardware host can read and write data in the FLASH memory of the game handle.

The common solutions to enter/identify the reading and writing mode include:

entering the reading and writing mode by a specific combination of keys (e.g., pressing the AI key and the setting key of the game handle simultaneously) of the game handle, and/or exiting the reading and writing mode by another specific combination of keys (e.g., pressing the AI key, the setting key of the game handle and the power ON/OFF key simultaneously) of the game handle;

entering and/or exiting the reading and writing mode by adding an individual key; or entering and/or exiting the reading and writing mode of the game handle by operating software (such as APP) on the hardware host.

When the USB interface is used to perform connection, the USB interface is switched to the U-disk enumeration mode if the game handle enters the reading and writing mode, such that the hardware host can read and write data in the FLASH memory of the game handle.

When the APP and Bluetooth communication is used, it can be identified whether the APP Bluetooth module is required to transmit files. If it is required to transmit files, the data in the FLASH memory of the game handle are read and written according to APP control signals.

By such reading and writing mode, the operation data in the game handle can be conveniently transmitted to the game console, the computer or the mobile phone, and can be copied in and out at any time. The users can back up the data, pass it to friends and publish it to the network, thereby facilitating communication, exchange and comparison among the users, and increasing the sociality of the game.

The foregoing is merely preferred embodiments of the present application and is not intended to limit the present application, and various changes and modifications may be made on the present application by those skilled in the art. Any modification, equivalent substitution, improvement and the like within the spirit and principles of the present application should all fall within the scope of protection of the present application.

What is claimed is:

1. A method for operating a game handle having a plurality of keys, the method comprising the steps of:

reading an AI key value of an AI key of said plurality of keys so as to identify whether the AI key is pressed after initialization of the handle, and whether a pressing time of the AI key reaches a preset value if the AI key is pressed;

carrying out an erasing operation on a FLASH chip of the game handle after the pressing time of the AI key reaches the preset value so as to control the game handle to output a reminder after the erasing operation;

reading a respective key value of each key of said plurality of keys so as to identify whether any key is pressed after the reminder is output, wherein if any key of said plurality of keys is pressed, a timer starts timing; and storing operation record data after a timing period of the timer reaches the preset value, wherein the step of reading the AI key value of the AI key comprises the steps of:

S1: initializing a chip and scanning the AI key value,
wherein a power supply key of said plurality of keys is activated,
wherein the game handle is powered on,
wherein each chip in the game handle is initialized,
wherein said plurality of keys are scanned for a first time,
wherein a respective key value of each key of said plurality of keys is read:

S1A: identifying whether the AI key is pressed; and
S1B: identifying whether the pressing time of the AI key reaches the preset value,
wherein the step of carrying out the erasing operation comprises the steps of:
S2: erasing the FLASH chip and forming a reminder of usage,
  wherein the erasing operation is carried out on the FLASH chip if the pressing time of the AI key reaches the preset value; and
S2A: after erasing, vibrating the game handle once as the reminder of usage,
wherein the step of reading the respective key value of each key of the plurality of keys comprises the steps of:
S3: scanning the respective key value of each key of the plurality of keys and starting timing,
S3A: after the reminder of usage, scanning the plurality of keys for a second time,
S3B: reading the respective key value of each key of the plurality of keys so as to identify any key of said plurality of keys is pressed,
  wherein, if any key of said plurality of keys is pressed, the timer is reset and starts timing; and
wherein the step of storing operation record data comprises the steps of:
S4: timing and scanning the AI key value, and
S4A: reminding an end of learning by vibrating the game handle,
  wherein a timing period of the timer reaches the preset value,
S4B: ending the storing the operation record data; after the end of learning, and
S4C: proceeding to repeat step S1.

2. A method for operating a game handle having a plurality of keys, the method comprising the steps of:
  reading an AI key value of an AI key of said plurality of keys so as to identify whether the AI key is pressed after initialization of the handle, and whether a pressing time of the AI key reaches a preset value if the AI key is pressed;
  carrying out an erasing operation on a FLASH chip of the game handle after the pressing time of the AI key reaches the preset value so as to control the game handle to output a reminder after the erasing operation;
  reading a respective key value of each key of said plurality of keys so as to identify whether any key is pressed after the reminder is output, wherein if any key of said plurality of keys is pressed, a timer starts timing; and
  storing operation record data after a timing period of the timer reaches the preset value,
  wherein the step of reading the AI key value of the AI key comprises the steps of:
  S1: initializing a chip and scanning the AI key value,
    wherein a power supply key is activated,
    wherein the game handle is powered on,
    wherein each chip in the game handle is initialized,
    wherein said plurality of keys are scanned for a first time,
    wherein a respective key value of each key of said plurality of keys is read;
  S1A: identifying whether the AI key is pressed; and
  S1B: if the AI key is pressed, identifying whether the AI key and a setting key of of said plurality of keys are pressed simultaneously;
  S1C: switching a U disk to perform reading and writing,
    wherein, if the AI key and the setting key are identified as being pressed simultaneously, a USB interface is switched to a U-disk enumeration mode, and
    wherein a computer terminal is used to read and write key value data of a FLASH memory; and
  S1D: completing reading and writing data so as to end scanning of the A1 key value,
    wherein, when reading and writing the key value data of the FLASH memory are completed at the computer terminal, the AI key value of the AI key is re-scanned,
    wherein whether a power ON/OFF key, the setting key and a learning key of the plurality of keys are pressed is identified;
    wherein, if the power ON/OFF key, the setting key and the learning key are pressed, the scanning of the A1 key value is shut down, and
    wherein, if at least one of the power ON/OFF key, the setting key and the learning key is not pressed, to step S1C is repeated.

3. The method for operating the game handle, according to claim 2, further comprises the steps of:
  S1E: reading the key value data of the key stored in the FLASH memory,
    wherein the key value data serves as operation instruction data;
  S1F: outputting operation instruction data through an output port of the game handle when a first condition is present,
    wherein the Step S1F further comprises the steps of:
      outputting a first reminder by vibrating the game handle once after erasing at the FLASH memory of the game handle;
      after outputting the first reminder, starting to scan and read the respective key value of each key of the of keys so as to identify whether any key of the plurality of keys is pressed;
      starting to time when any key of said plurality of keys is pressed;
      scanning and reading data of the respective key value of each key of the plurality of keys when the timing period of the timer does not reach the preset value,
      storing the data in the FLASH memory in the game handle;
      ending recording and storing the data of the respective key value of each key of the plurality of keys after the timing period of the timer reaches the preset value;
      selectively outputting a second reminder by vibrating the game handle once; and
      although the timing period of the timer does not reach the preset value, detecting the AI key being pressed again by scanning so as to end recording and storing the data of the respective key value of each key of the plurality of keys, while, selectively outputting the second reminder.

4. The method for operating the game handle, according to claim 3, wherein the first condition is that the AI key is pressed before the preset value.

5. The method for operating the game handle, according to claim 1, wherein Step S1A comprises the steps of:
  reading current key value data by the chip in S1,
  transmitting encoded data in the game handle to a receiving device through a data transmission port of the game handle, and re-scanning the A1 key value, when the AI key is not pressed;

wherein, when the AI key is single-clicked, the method comprises the steps of:
performing an initialization setting at a pointer position of the FLASH;
storing operation record data in the FLASH;
reading the operation record data by the chip in S1;
transmitting the operation record data to the receiving device through the data transmission port of the game handle; and
returning to Step S1, if the scanning shows that a key of the plurality of keys is pressed, and wherein, when the AI key and the setting key of the game handle are not pressed simultaneously, the pressing time of the AI key does not reach the preset value, and the AI key is single-clicked or double-clicked, an initialization setting is performed at the pointer position of the FLASH.

6. The method for operating the game handle, according to claim 5, the method further comprising the step of:
moving a pointer of the FLASH backward for a specified length,
if the scanning shows that no key of the plurality of keys is pressed, a pointer position of the FLASH is at point FF returning to step, and
if the pointer position of the FLASH is not at point FF, reading the operation record data stored in the FLASH and transmitting the operation record data to the receiving device through data transmission port of the game handle.

7. The method for operating the game handle, according to claim 5, wherein, when the AI key is double-clicked, the method comprises the steps of:
performing the initialization setting at the pointer position of the FLASH;
reading the operation record data stored in the FLASH;
transmitting the operation record data to the receiving device through the data transmission port of the game handle; and
returning to Step S1, if the scanning shows that a key of the plurality of keys is pressed, and
wherein, if the scanning shows that no key of the plurality of keys is pressed, the method further comprises:
moving a pointer of the FLASH backward for a specified length,
if the pointer position of the FLASH is at point FF, performing the initialization setting at the pointer position of the FLASH, and
if the pointer position of the FLASH is not at point FF, reading the operation record data stored in the FLASH and transmitting the operation record data to the receiving device by the data transmission port of the game handle.

8. The method for operating the game handle, according to claim 3,
wherein, when a second condition is present, the key value data of the key stored in the FLASH memory of the game handle are served as the operation instruction data and repeatedly output for multiple times,
wherein the second condition is that the AI key is double-clicked,
wherein, when the AI key is double-clicked, in which the AI key is pressed twice in a time interval, said time interval between two clicks not exceeding a click preset value, the operation data in the FLASH memory are read, and the operation data are served as the operation instruction and repeatedly output for multiple times, and
wherein, if it is detected that any key of the plurality of keys other than the AI key is pressed, an AI output mode is stopped so as to return to a state of real-time outputting instructions.

9. The method for operating the game handle, according to claim 1, wherein the Step S4 comprises the steps of:
identifying whether the AI key is pressed if the timing period of the timer does not reach the preset value;
vibrating the game handle, if the AI key is pressed to form a reminder showing the end of learning;
storing the operation record data by the game handle, if the AI key is pressed;
after the end of learning, proceeding to step S1 again;
reading key value data and transmitting to the data transmission portion, if the AI key is not pressed; and
writing key value data to the FLASH memory and performing step S4 again, if the AI key is not pressed.

10. A method for operating a game handle having a plurality of keys, the method comprising the steps of:
reading an AI key value of an AI key of said plurality of keys so as to identify whether the AI key is pressed after initialization of the handle, and whether a pressing time of the AI key reaches a preset value if the AI key is pressed;
carrying out an erasing operation on a FLASH chip of the game handle after the pressing time of the AI key reaches the preset value so as to control the game handle to output a reminder after the erasing operation;
reading a respective key value of each key of said plurality of keys so as to identify whether any key is pressed after the reminder is output, wherein if any key of said plurality of keys is pressed, a timer starts timing;
storing operation record data after a timing period of the timer reaches the preset value;
initializing a chip;
scanning the AI key value;
identifying APP communication requirements,
wherein a power supply key is activated,
wherein the game handle is powered on,
wherein each key chip in the game handle is initialized,
wherein the plurality of keys are scanned for a first time,
wherein a key value of each chip of the game handle is read,
wherein, whether an APP Bluetooth module is required to transmit files is identified;
if the APP Bluetooth module is required to transmit the files, performing an initialization at a pointer position of the FLASH and FLASH data are read and written according to APP control signals;
stopping scanning the AI key when the FLASH data are read and written, and it is identified whether reading and writing are completed after the FLASH data are read and written;
re-scanning the plurality of keys upon completion of reading and writing,
wherein the FLASH data are read and written according to the APP control signals if reading and writing are not completed;
scanning the plurality of keys if the APP Bluetooth module is not required to transmit files;
identifying whether the AI key on the game handle is pressed and identifying whether the AI key is single-clicked or double-clicked if the AI key is pressed;
returning to step S1 if the AI key is not pressed;

performing an initialization setting at the pointer position of the FLASH in the chip if the AI key is single-clicked;
reading operation record data stored in the FLASH by the chip and transmitting the operation record data to a receiving device by a data transmission port of the game handle;
moving the pointer position of the FLASH backward, identifying whether the pointer position data are FF, and returning to step S1 if pointer position data are FF;
continuing to read the operation record data stored in the FLASH if the pointer position data are not FF, and transmitting the operation record data to the receiving device by the data transmission port of the game handle;
returning to step S1 when any key is pressed;
performing the initialization setting at the pointer position of FLASH in the chip if the AI key is double-clicked;
reading the operation record data stored in the FLASH by the chip and transmitting the operation record data to the receiving device by the data transmission port of the game handle;
moving the pointer position of the FLASH backward, identifying whether the pointer position data are FF, and returning to step S4 if the pointer position data are FF;
continuing to read the operation record data stored in the FLASH if the pointer position data are not FF, and transmitting the operation record data to the receiving device by the data transmission port of the game handle; and
returning to step S1 when any key is pressed.

11. The method for operating the game handle, according to claim 1, further comprising the steps of:
activating reading and writing by a first combination of keys of of the plurality of keys, said first combination being comprised of the AI key and a setting key of the plurality of keys being pressed simultaneously; and
ending reading and writing by a second combination of keys of the plurality of keys, said second combination being comprised of the AI key, the setting key, and a power ON/OFF key of the plurality of keys being pressed simultaneously.

12. The method for operating the game handle, according to claim 2,
wherein a USB interface is connected to the U-disk for a hardware host to perform reading and writing of data in a game handle FLASH memory.

13. The method for operating the game handle, according to claim 10,
wherein the FLASH data are read and written according to APP control signals in a game handle FLASH memory of the game handle.

* * * * *